(12) United States Patent
Uchiumi et al.

(10) Patent No.: US 7,525,225 B2
(45) Date of Patent: Apr. 28, 2009

(54) VIBRATION GENERATING MOTOR

(75) Inventors: Hidehiro Uchiumi, Tokyo (JP); Toshio Suzuki, Tokyo (JP); Tomohide Aoyagi, Tokyo (JP); Takeshi Kogawa, Tokyo (JP); Kazuo Morita, Tokyo (JP)

(73) Assignee: Namiki Seimitsu Houseki Kabuhsiki Kaisha, Tokyo (JP)

( * ) Notice: Subject to any disclaimer, the term of this patent is extended or adjusted under 35 U.S.C. 154(b) by 196 days.

(21) Appl. No.: 10/572,601

(22) PCT Filed: Aug. 17, 2004

(86) PCT No.: PCT/JP2004/011758

§ 371 (c)(1),
(2), (4) Date: Jan. 5, 2007

(87) PCT Pub. No.: WO2005/027317

PCT Pub. Date: Mar. 24, 2005

(65) Prior Publication Data

US 2007/0278871 A1 Dec. 6, 2007

(30) Foreign Application Priority Data

Sep. 9, 2003 (JP) ............................. 2003-317576

(51) Int. Cl.
*H02K 7/065* (2006.01)
*H02K 5/22* (2006.01)

(52) U.S. Cl. .......................................... 310/81; 310/71

(58) Field of Classification Search .................. 310/71, 310/81
See application file for complete search history.

(56) References Cited

U.S. PATENT DOCUMENTS 6,394,768 B1    5/2002  Fukuda et al.

6,424,064 B2 *  7/2002  Ibata et al. ..................... 310/81
6,740,999 B1 *  5/2004  Segawa ......................... 310/81

(Continued)

FOREIGN PATENT DOCUMENTS

CN           001334633       2/2002

(Continued)

OTHER PUBLICATIONS

International Search Report Application No. PCT/JP2004/011758 dated Oct. 5, 2004.

*Primary Examiner*—Burton Mullins
(74) *Attorney, Agent, or Firm*—Studebaker & Brackett PC; Donald R. Studebaker

(57) ABSTRACT

To realize high reliability and a long-term stabilized power supply (long lifetime) in the connection between a power supply terminal and a power supply land on a circuit board. A motor for generating vibration comprising a vibration generating mechanism having a rotating shaft attached with a weight, a housing case for accommodating at least a part of the aforementioned vibration generating mechanism, and a pair of power supply terminals protruding from the aforementioned housing for electrically connecting the power supply terminal to a power supply land by making the terminal elastically in contact with the power supply land of a power source side circuit board to be mounted in a housing of a portable apparatus and for supplying power to the aforementioned vibration generating mechanism, wherein each of a bending point and an action point of a movable portion of the power supply terminal movable in the direction in which the aforementioned power supply terminal contacts the aforementioned power supply land is arranged in a plane that includes a center of gravity of vibrational motion of the aforementioned motor for generating vibration and is almost perpendicular to the rotating axis of the aforementioned weight.

13 Claims, 19 Drawing Sheets

U.S. PATENT DOCUMENTS 6,872,104 B2 * 3/2005 Sun .............................. 439/862
6,954,015 B2 * 10/2005 Segawa ........................ 310/71
7,045,921 B2 * 5/2006 Takagi et al. .................. 310/89
7,129,607 B2 * 10/2006 Segawa ........................ 310/81
7,265,465 B2 * 9/2007 Suzuki et al. ................. 310/71

FOREIGN PATENT DOCUMENTS

| | | |
|---|---|---|
| EP | 1463180 * | 9/2004 |
| JP | 11-136327 | 5/1999 |
| JP | 2000-078790 | 3/2000 |
| JP | 2000-201464 | 7/2000 |
| JP | 2000-286296 | 10/2000 |
| JP | 2001-095200 | 6/2001 |
| JP | 2002-044904 | 8/2002 |
| JP | 2003-174753 | 6/2003 |
| WO | WO 99-23801 | 5/1999 |
| WO | WO-03/049254 | 6/2003 |

* cited by examiner (A)

(B)

Prior Art

Prior Art

Prior Art

Prior Art

Prior Art

Prior Art

Prior Art

VIBRATION GENERATING MOTOR

BACKGROUND OF THE INVENTION

1. Field of the Invention

This invention relates to a device for generating vibration that is mainly mounted in a portable apparatus (including such electronic devices as a mobile phone, a PHS, a small wireless communications device, and other various portable information communications terminals) to perform a soundless alarm function, specifically to a power supply mechanism for a power supply land of a circuit board of a power source side in a housing of a portable apparatus and for the aforementioned motor for generating vibration held by the housing.

2. Description of the Related Art

A sudden incoming ring tone of a portable apparatus may sometimes disturb others in, for example, a quiet public space such as an art gallery and a concert hall with many people in a room for important commercial negotiations or conferences. Therefore, a wireless alarm function using a device for generating vibration to report an incoming signal with sensible vibration is mounted in various portable apparatuses.

The devices for generating vibration can mainly be classified into two types from the viewpoint of structures. One of these is a so-called motor for generating vibration using a small motor (hereafter briefly referred to as a vibration motor, as required), and the other is a multi-functional device equipped with both sound and buzzer functions of a speaker drive type in which a magnetic circuit section is reciprocated by low frequency signals (hereafter briefly referred to as a vibration actuator, as required).

In the case of the aforementioned vibration motor, a portable apparatus such as a mobile phone is vibrated by providing a rotating shaft driven by the motor with a weight having an eccentric center of gravity or with a deflecting member to utilize an unequal load due to centrifugal force caused by eccentric rotation of the weight etc. having an eccentric center of gravity during rotor operation. As such various portable apparatuses are used more popularly, the percentage of apparatuses equipped with such mechanism and frequency of using such mechanism are increasing day by day.

Similarly, the aforementioned vibration actuator equipped with both the vibration generating function of the magnetic circuit section by low frequency signals and the sounding function within a human voice range can realize highly efficient use of installation space because of adoption of a flat type multifunctional integral part and is more widely used corresponding to each application. Especially recent mobile phones and PHSs, which have become popular and of which the size is greatly reduced, are efficiently equipped with these two types of devices for generating vibration in their limited mounting spaces in the housings.

In these portable apparatuses, a power supply method from a power source (mainly circuit board) to a main unit of a device for generating vibration is improved day by day. For example, instead of a conventional connecting method such as using a soldered lead wire or a connector, a structure having a combination of an elastic pressing body and a leaf spring-like power supply terminal or a structure having a power supply terminal directly connected to a circuit board by soldering are newly examined.

For instance, a power supply terminal structure shown in FIG. 12 is conventionally used as a method in which the aforementioned vibration motor can be built into a main unit of a portable apparatus (hereafter briefly referred to as an apparatus main unit, as required) in relatively few man-hours for assembly and which enables a direct power supply from a circuit board to a motor main unit.

Power supply terminals 104 shown in FIG. 12 are arranged on a terminal block 105 on which an end of a housing case 103 of a vibration motor 101 having a weight 106 is to be mounted and comprises leaf springs, one end of each of which is soldered to the terminal at a connecting portion 104e and in which a part of each strip plate extending from the aforementioned terminal 105 to a contact portion 104d is bent at a bending portion 104b.

The contact portion 104d at a forward end of a movable portion 104c of the power supply terminal 104 is pressed onto a power supply land 55 of a circuit board 50 provided in the apparatus main unit by allowing the power supply terminal 104 to be elastically deformed at this bending portion 104b. In addition, there is a method in which an elastic spring body 130g is arranged between the power supply terminal 104 and a housing case 103 as a part of a holder 130 covering the aforementioned housing case 103 and is combined with a housing of the apparatus main unit to press the contact portion 104d of the power supply terminal 104 onto the power supply land 55 utilizing the interaction between the rubber elasticity of a convex section of the aforementioned elastic pressing body 130g and leaf spring elasticity of the aforementioned power supply terminal 104 as shown in FIG. 12 (B) The following references are examples of related art discussed above:

Japanese Patent Laid-Open publication number 2000-78790,

International Patent Publication number WO99/23801, and

Japanese Patent Laid-Open publication number 2001-95200.

Further, there is a power supply terminal structure having, for example, a coil spring-like portion that is made by winding a wire rod having spring elasticity as a power supply terminal structure similarly functioning as the aforementioned leaf spring terminal as shown in FIG. 15, although the shape is apparently different from the leaf spring terminals. The following reference is an example of related art discussed above:

Japanese Patent Laid-Open publication number 2002-44904.

Furthermore, a power supply terminal structure using a coil spring made by winding a wire rod having spring elasticity has conventionally been designed for vibration motors. The following reference is an example of related art discussed above:

Japanese Patent Laid-Open publication number 11-136327.

SUMMARY OF THE INVENTION

However, in the case of the aforementioned patent reference 4 shown in FIG. 15, a movable portion 204c of a power supply terminal 204 is elastically deformed mainly at a winding portion 204b corresponding to the bending portion 104b at an end of a housing case 203 shown in the aforementioned FIG. 12 in the same way, for example, as the power supply terminal 104 shown in FIG. 12. In the condition that a vibration motor 201 is mounted on a circuit board of the apparatus main unit, a distance in the axial direction of the rotating shaft between the aforementioned winding portion 204b and a contact portion 204d (distance between a bending point and an action point) is long, and in a box of a terminal block 205, there is no core at the center of the aforementioned winding section 204b. Therefore, the movable portion 204c is not sufficiently stable at the position between P and Q of the power supply terminal 204 during vibration functioning (during vibrational motion), causing high oscillation of the power supply terminal 204 itself.

Thus, contact wear due to vibration frequently found at the area in contact with a power supply land surface results in an insufficient continuity problem. The aforementioned contact wear due to vibration can be a cause of generating black powder due to sparks at the electrical contact, leading to an important problem of significant loss of reliability in a power supply connection mechanism. Especially in the vibration motor, the above problem frequently arises in the poor condition associated with vibration.

On the other hand, it is said that loss of spring elasticity of the power supply terminal is compensated by an elastic pressing body commonly described in the patent references 1 through 3, and the spring elasticity is even enhanced by the elastic pressing body. However, basically, a single power supply terminal still uses a thin plate type leaf spring having a long distance from the bending point to the contact portion where elastic force tends to decrease as mentioned above. In addition, since the elastic pressing body is placed between them, the pressing force is always fluctuating. Thus, that is not a suitable method for solving the problem of oscillation of the power supply terminal itself.

The important problem of the conventional structure of the power supply terminal common to the above and to be solved is how to surely connect the power supply land using a circuit board surface as a grounding reference surface and the contact portion of the power supply terminal of the vibration motor that is in contact with the power supply land without adversely affected by vibration. For example, it is known that, in case of the vibration motor 101 of which rotating shaft is provided with the weight 106, the vibration motor whirls the shaft end around "G" (hereafter referred to as center of gravity G of vibrational motion) shown in the drawing by rotating the eccentrically installed weight 106 in the condition that the motor is held in a housing through a holder 130 as shown in FIGS. 13 and 14. The oscillation condition of the power supply terminal 104 due to vibrational motion is shown in derived circles as enlarged views in FIGS. 13 and 14.

The contact portion 104*d* of the power supply terminal 104 is greatly oscillated around the gravity center G of vibrational motion with amplitudes P7 and P8 when viewed from a top side shown in FIG. 13 and a front side shown in FIG. 14. In addition, since the elastic pressing body 130*g* of the holder 130 is elastically deformed at a clearance N between a circuit board 50 shown in the aforementioned FIG. 12 and the housing case 103, expanding and contracting actions are actually added with an amplitude P9. Thus, the total travel amount caused by oscillation of the contact portion 104*d* of the power supply terminal 104 is the sum of P7, P8, and P9. Furthermore, a distance L3 between a bending point F as the bending portion 104*b* of the power supply terminal 104 and an action point E as the contact portion 104*d* shown in FIG. 12 greatly affect the oscillation in addition to the aforementioned total travel amount of P7, P8, and P9. In other words, the longer distance L3 resulting in the lower rigidity of the power supply terminal itself causes the larger displacement of the contact portion 104*d* due to the aforementioned oscillation, leading to easy generation of contact wear at the contact area. Eventually, there was a problem that the power supply land of the circuit board side is adversely affected, leading to poor continuity.

In the way similar to this, FIGS. 16 through 19 show examples of the other models of vibration motor. In case of the vibration motor 101 of which rotating shaft is provided with a weight 106, the vibration motor whirls the shaft ends around the center of gravity G of vibrational motion shown in the drawing by rotating the eccentrically installed weight 106 in the way similar to that shown in the aforementioned FIGS. 12 through 14. The oscillation condition of the power supply terminal 104 due to vibrational motion this time is shown in derived circles of FIGS. 17 and 18 as enlarged views in the way similar to the aforementioned drawings.

The contact portion 104*d* of the power supply terminal 104 is more greatly oscillated with amplitudes P10 and P11 around the center of gravity G of vibrational motion when viewed from the top shown in FIG. 17 and the front shown in FIG. 18. Moreover, since the elastic pressing body 130*g* of the holder 130 is elastically deformed at a clearance N between the circuit board 50 and the housing case 103, expanding and contracting actions are actually added with an amplitude P12. Thus, the total travel amount caused by oscillation of the contact portion 104*d* of the power supply terminal 104 is the sum of P10, P11, and P12. Furthermore, a distance L4 between the bending point F as the bending portion of the power supply terminal 104 and the action point E as the contact portion 104*d* shown in FIG. 16 greatly affects the oscillation in addition to the aforementioned total travel amounts of P10, P11, and P12. Thus the longer distance L4 resulting in the lower rigidity of the power supply terminal 104 itself causes the larger displacement of the contact portion 104*d* due to the aforementioned oscillation, leading to easy generation of contact wear at the contact area, and eventually, the power supply land of circuit board is adversely affected.

Further, in this terminal structure, since the leaf spring-like power supply terminal 104 and the elastic pressing body 130*g* are arranged on the surface of the circuit board 50 in a stacking manner in the height direction between the circuit board and the housing case 103 of the vibration motor main unit in the way similar to that shown in the aforementioned FIGS. 12 through 14, pressing force of the contact portion 104*d* determined by terminal height (clearance N) often varies depending on the accuracy of parts built in the housing. In other words, in the sandwich condition between the housing (not illustrated) of the apparatus main unit and the internal circuit board 50, the height in the arrangement space of the housing sometimes varies depending on an individual housing to which the vibration motor is installed. This means the pressing force (terminal pressure) of the contact portion 104*d* is in the easily varying condition due to variation of the clearance N against the surface of the power supply land 55 of the circuit board 50.

FIG. 19 is a graph showing the relationship between the aforementioned height (hereafter referred to as terminal height, as required) and the pressing force of the contact portion 104*d* (hereafter referred to as terminal pressing force, as required) as an example in the above case. From the viewpoint of design considering assembly, it is preferable that the reference value of the terminal height shown in FIG. 19 is 6.0 mm to obtain a terminal pressing force of 0.75 N. However, since the terminal height may vary within a tolerance of ±0.2 mm considering the actual dimension of assembled parts, the terminal pressing force may vary depending on the terminal height that exists within the substantial range between 5.8 and 6.2 mm. If the terminal height is 6.2 mm, the terminal pressing force of the conventional product using an elastic pressing body decreases by 0.50 N. Thus, there is a possibility that incomplete continuity at the contact portion or wear due to oscillating motion of the power supply terminal occur. On the other hand, the terminal height of the product using no elastic pressing body according to this invention hardly changes and can provide stable terminal pressing force of 0.65 N.

Further, if the terminal height is 5.8 mm, since the terminal pressing force of the conventional product using the elastic pressing body reaches 2.00 N, there is a possibility this time that excessive pressing force at the contact portion causes dent, deformation, or partial wear. On the other hand, the terminal height of the product using no elastic pressing body according to this invention hardly changes and can obtain stable terminal pressing force of 0.85 N. As shown by these examples, since the pressing force of the power supply terminal 104 for the conventional vibration motor 101 greatly varies depending on the elastic deformation condition of the elastic pressing body 130g, it is very difficult to maintain constant pressing force (terminal pressure) after assembly.

Especially, when the vibration motor 101 is held by the holder 130 having a large clearance N between the holder and the elastic pressing body 130g, the pressing force on the overall surface in contact with the circuit board 50 varies depending on the variation of elastic deformation amount in the height direction and the mounting height position, leading to repetition of fine expanding and contracting actions due to vibration between the circuit board surface and the vibration motor main unit. Thus, the contact position of the power supply terminal 104 with the surface of the circuit board 50 varies, causing wear at the contact area. On the contrary, when the entire holder 130 with the elastic pressing body 130g is compressed so as to decrease the clearance N in the height direction and the contact portion 104d of the power supply terminal 104 is strongly pressed onto the power supply land 55 of the circuit board 50, the pressing force in the vertical direction of the circuit board also becomes excessively high, leading to a possibility of severe damage to the power supply land 55.

As described above, a purpose of this invention is to secure high reliability in the connection between a power supply terminal of a vibration motor and a power supply land of a circuit board of an apparatus main unit, in which the motor is to be mounted, to provide a power supply mechanism for a vibration motor that ensures electrically stable operation to solve the abovementioned problems. An additional purpose is to enable realization of both a mounting structure for a vibration motor main unit avoiding the circuit board from being subjected to excessive stress or load and a holding structure that ensures the transmission of vibration to a housing of a portable apparatus.

In order to achieve the aforementioned purposes, an embodiment of the invention provides a motor for generating vibration comprising a vibration generating mechanism having a rotating shaft attached with a weight, a housing case for accommodating at least a part of the aforementioned vibration generating mechanism, and a pair of power supply terminals protruding from the aforementioned housing for electrically connecting the power supply terminal to a power supply land by making the terminal elastically in contact with the power supply land of a power source side circuit board to be mounted in a housing of a portable apparatus and for supplying power to the aforementioned vibration generating mechanism, wherein each of a bending point and an action point of a movable portion of the power supply terminal movable in the direction in which the aforementioned power supply terminal contacts the aforementioned power supply land is arranged in a plane that includes a center of gravity of vibrational motion of the aforementioned motor for generating vibration and is almost perpendicular to the rotating axis of the aforementioned weight.

Specifically, the bending point F and the action point E are arranged in a plane M that includes a center of gravity C of vibrational motion of a vibration motor 1 and is almost perpendicular to a rotating axis 2, for example, as shown in FIG. 1.

Another embodiment of the invention provides a motor for generating vibration, wherein, as for a positional relationship between a center of gravity of vibrational motion of the aforementioned motor for generating vibration and an action point of a movable portion of a power supply terminal arranged in a plane that includes the aforementioned center of gravity of vibrational motion and is almost perpendicular to a rotating axis of a weight, when the aforementioned motor for generating vibration is built on a circuit board inside a housing of a portable apparatus, the action point of the movable portion of the aforementioned power supply terminal that is movable while in contact with a power supply land is arranged in a direction in which the action point approaches the aforementioned center of gravity of vibrational motion.

Specifically, the action point F positioned in the tip end portion of the power supply terminal 4 is arranged so that the action point moves in a direction shown by an arrow, namely a direction in which the action point is pushed by the power supply land of the circuit board to be built in to be allowed to approach the center of gravity G of vibrational motion for example as shown in FIGS. 1, 3, and 9. In addition, the action point is arranged so as to approach the aforementioned center of gravity of vibrational motion even when the action point E is positioned outside the bending point F and the power supply terminal 4 is positioned in the direction opposite to the aforementioned arrow contrary to the aforementioned drawing.

Another embodiment of the invention provides a motor for generating vibration, wherein, as for a positional relationship between a center of gravity of vibrational motion of the aforementioned motor for generating vibration and an action point of a movable portion of a power supply terminal arranged in a plane that includes the aforementioned center of gravity of vibrational motion and is almost perpendicular to a rotating axis of a weight, when the aforementioned motor for generating vibration is built on a circuit board inside a housing of a portable apparatus, the action point of the movable portion of the aforementioned power supply terminal that is movable while in contact with a power supply land is arranged in a condition where the action point is movable in a direction almost perpendicular to the aforementioned power supply land or in an almost circumferential direction.

Specifically, the aforementioned action point F shown in, for example, FIGS. 1, 3, and 9, is arranged so that the action point can move in a direction almost perpendicular to the aforementioned power supply land or in an almost circumferential direction. For example, when a travel amount is small, it moves almost vertically and when a travel amount or a movable angle is large, it moves in an almost circumferential direction.

Another embodiment of the invention provides a motor for generating vibration, wherein, as for a positional relationship between a bending point and an action point of a power supply terminal provided in a plane that includes a center of gravity of vibrational motion of the aforementioned motor for generating vibration and is almost perpendicular to a rotating axis of a weight, when the aforementioned motor for generating vibration is built on a circuit board inside a housing of a portable apparatus, the action point of the movable portion of the aforementioned power supply terminal is arranged so that the action point is closer than a bending point to a vertical line drawn from the aforementioned center of gravity of vibrational motion onto the circuit board.

Specifically, the action point E of the movable portion of the power supply terminal is arranged so that the action point is closer than the bending point F to a vertical line Y drawn from the center of gravity G of vibrational motion onto the circuit board, for example, as shown in FIG. 4.

Another embodiment of the invention provides a motor for generating vibration, wherein, as for a relationship among a center of gravity of vibrational motion of the aforementioned motor for generating vibration, a bending point and an action point of a movable portion of a power supply terminal arranged in a plane that includes the aforementioned center of gravity G of vibrational motion and is almost perpendicular to a rotating axis of a weight, when the aforementioned motor for generating vibration is built on a circuit board inside a housing of a portable apparatus, the bending point and the action point of the aforementioned movable portion of the power supply terminal are arranged along the circuit board surface within an angular range of approximately 45 degrees for one side or within approximately 90 degrees for both sides from a vertical line drawn from the aforementioned center of gravity of vibrational motion assuming the center of gravity G of vibrational motion as the vertex of a triangle.

Specifically, the aforementioned bending point F and the action point E are arranged in an angular range of W surrounded by a triangle positioned between the center of gravity G of vibrational motion and the circuit board surface, for example, as shown in FIG. 4.

Another embodiment of the invention provides a motor for generating vibration, wherein a ring-like contact portion is formed at a tip end of a movable portion of the aforementioned power supply terminal, and a contact point with a power supply land is arranged at a part of an outer periphery of the aforementioned circular contact portion.

Specifically, the ring-like contact portion provided at the tip end of the movable portion of the power supply is arranged so that the contact portion is externally in contact with the power supply land of the circuit board, for example, as shown in FIGS. 1 through 4.

Another embodiment of the invention provides a motor for generating vibration, wherein a ring-like contact portion is formed at a tip end of a movable portion of the aforementioned power supply terminal, and a multi-contact portion with a power supply land is arranged at a part of an outer periphery of the aforementioned circular contact portion.

Specifically, the aforementioned ring-like contact portion having multiple turns of winding is arranged so that the aforementioned arc-like contact portion is externally in contact with the power supply land of the circuit board at multiple contact points, for example, as shown in FIGS. 1, 2, and 5.

Another embodiment of the invention provides a motor for generating vibration, wherein an outer periphery of a circular contact portion at a tip end of a movable portion of the aforementioned power supply terminal is arranged in a plane almost perpendicular to a rotating axis of a weight.

Specifically, the outer periphery of the circular contact portion at the tip end of the movable portion of the power supply terminal is arranged along the plane, which is almost perpendicular to the rotating axis of the weight and in which the contact portion moves, for example, as shown in FIGS. 1, 2, and 5.

Another embodiment of the invention provides a motor for generating vibration, wherein the aforementioned power supply terminal is manufactured by forming an elastic spring member made from a wire rod.

Specifically, a pair of the power supply terminals is manufactured by forming an elastic spring member made from a wire rod, for example, as shown in FIGS. 1 through 11.

Another embodiment of the invention provides a motor for generating vibration, wherein at least a part of a terminal block holding the aforementioned pair of power supply terminals is positioned at the center of an outer side of a housing case cylinder, the terminal block has a shape of a plane, which is formed in parallel with a rotating axis of a weight, the aforementioned plane portion of the terminal block keeps the clearance between the aforementioned housing case and the circuit board surface constant, and when the aforementioned motor for generating vibration is built on a circuit board inside a housing of a portable apparatus, the aforementioned circuit board surface is directly in contact with the aforementioned plane portion of the terminal block in a face to face manner, and at the same time the contact portion of the power supply terminal is electrically connected to the aforementioned power supply land of the circuit board in almost the same plane as the aforementioned plane portion of the terminal block.

Specifically, the circuit board surface is directly in contact with the plane portion of the terminal block in the face to face manner without allowing anything to exist between the two planes, and at the same time, the contact portion of the power supply terminal is electrically connected to the aforementioned power supply land of the circuit board in almost the same plane as the aforementioned plane portion of the terminal block, for example, as shown in FIGS. 4, 7, and 9.

Another embodiment of the invention provides a motor for generating vibration, wherein a part of the aforementioned power supply terminal is held in a condition of winding around a winding core section provided to the aforementioned terminal block.

Specifically, a part of the power supply terminal 4 is provided with a winding section 4b formed so that a part of the power supply terminal 4 is wound around the winding core portion 5d made by extending the terminal block 5 in the axial direction of the rotating axis 2, for example, as shown in FIG. 2.

Another embodiment of the invention provides a motor for generating vibration, comprising a holder for holding the aforementioned motor for generating vibration in a housing of a portable apparatus, wherein, when an aforementioned motor for generating vibration is built on a circuit board inside a housing of a portable apparatus, a grounding plane portion on which a holder covering a housing case of the aforementioned motor for generating vibration in contact with the aforementioned circuit board surface is positioned at both ends of a rotating axis of a weight on a plane portion of a terminal block of the aforementioned motor for generating vibration, and the aforementioned plane portion of the terminal block and the aforementioned grounding plane portion of the holder are arranged in almost the same plane.

Specifically, the grounding plane portion on which the holder covering the housing case of the aforementioned motor for generating vibration in contact with the aforementioned circuit board surface through the plane portion 5c is positioned at both sides of the rotating axis of the weight on the plane portion of the terminal block of the aforementioned motor for generating vibration, and the aforementioned plane portion of the terminal block and the aforementioned grounding plane portion of the holder are arranged in almost the same plane, for example, as shown in FIG. 7.

Another embodiment of the invention provides a motor for generating vibration, wherein the aforementioned motor for generating vibration is mounted on a circuit board inside the aforementioned housing of a portable apparatus, and the aforementioned power supply land of the circuit board is electrically connected to the power supply terminal of the aforementioned motor for generating vibration in the condition that the power supply land is elastically in contact with the power supply terminal by an action for assembling the housing of an apparatus.

As described above, this invention can realize high reliability in a connection between a power supply terminal of a vibration motor and a power supply land of a circuit board of an apparatus main unit on which the power supply terminal is to be mounted, power supply stable in the long term and long life of a power supply terminal thanks to elimination of wear of a contact portion caused by vibration. Thus, this invention provides a vibration motor that is electrically operated in the more stable condition and has higher durability than a conventional vibration motor. Furthermore, this invention provides a vibration motor having a structure for connecting a power supply terminal without allowing the circuit board and the power supply land to be subjected to excessive stress or load and simultaneously having a structure for holding the vibration motor in order to surely transmit generated vibration to the housing of the apparatus main unit.

That is to say, this invention provides a vibration motor comprising a vibration generating mechanism having a rotating shaft attached with a weight, a housing case for accommodating at least a part of the aforementioned vibration generating mechanism, and a pair of power supply terminals protruding from the aforementioned housing case that are connected to a power supply land of a circuit board of power source side to be mounted in a housing of a portable apparatus in the elastically contacting condition to supply power to the aforementioned vibration generating mechanism, wherein a bending point and an action point of a movable portion of power supply terminal that is movable in the direction in which the power supply terminal is to be in contact with the aforementioned power supply land are arranged in a plane that includes a center of gravity of vibrational motion of the aforementioned vibration motor and is almost perpendicular to a rotating axis of the aforementioned weight to realize a power supply terminal structure that is most hardly affected by vibrational motion generated by the vibration motor main unit.

An overall travel amount of a contact portion of a power supply terminal according to this invention is substantially limited to one-fourth to one-tenth of that of a conventional power supply terminal using a leaf spring.

Moreover, in the aforementioned power supply terminal, the distance between a bending point (bending portion) where the spring is bent to provide spring elasticity and an action point (contact portion) is shorter, elastic force is easily generated contributed by a winding portion, and sufficient pressing connection is enabled only by spring elastic force provided to the power supply terminal itself. Therefore, reliability of the contact portion of the power supply terminal in electrification is improved when it is connected to the power supply land by assembling.

Therefore, it is possible to improve reliability of a vibration motor in mounting on a circuit board and to keep elastic pressing force acting to the power supply land constant to enable stable contact between the power supply land and the contact portion of the power supply terminal.

In addition, a portable apparatus excellent in reliability is obtained by mounting a vibration motor having these effects according to this invention.

DESCRIPTION OF THE PREFERRED EMBODIMENTS

First Embodiment

Now the structure of the first embodiment according to this invention is described referring to FIGS. 1 through 7. In this first embodiment, a cylindrical vibration motor of coreless type having a rotating shaft attached with an eccentric weight is taken as an example of a motor for generating vibration.

Figure 1:
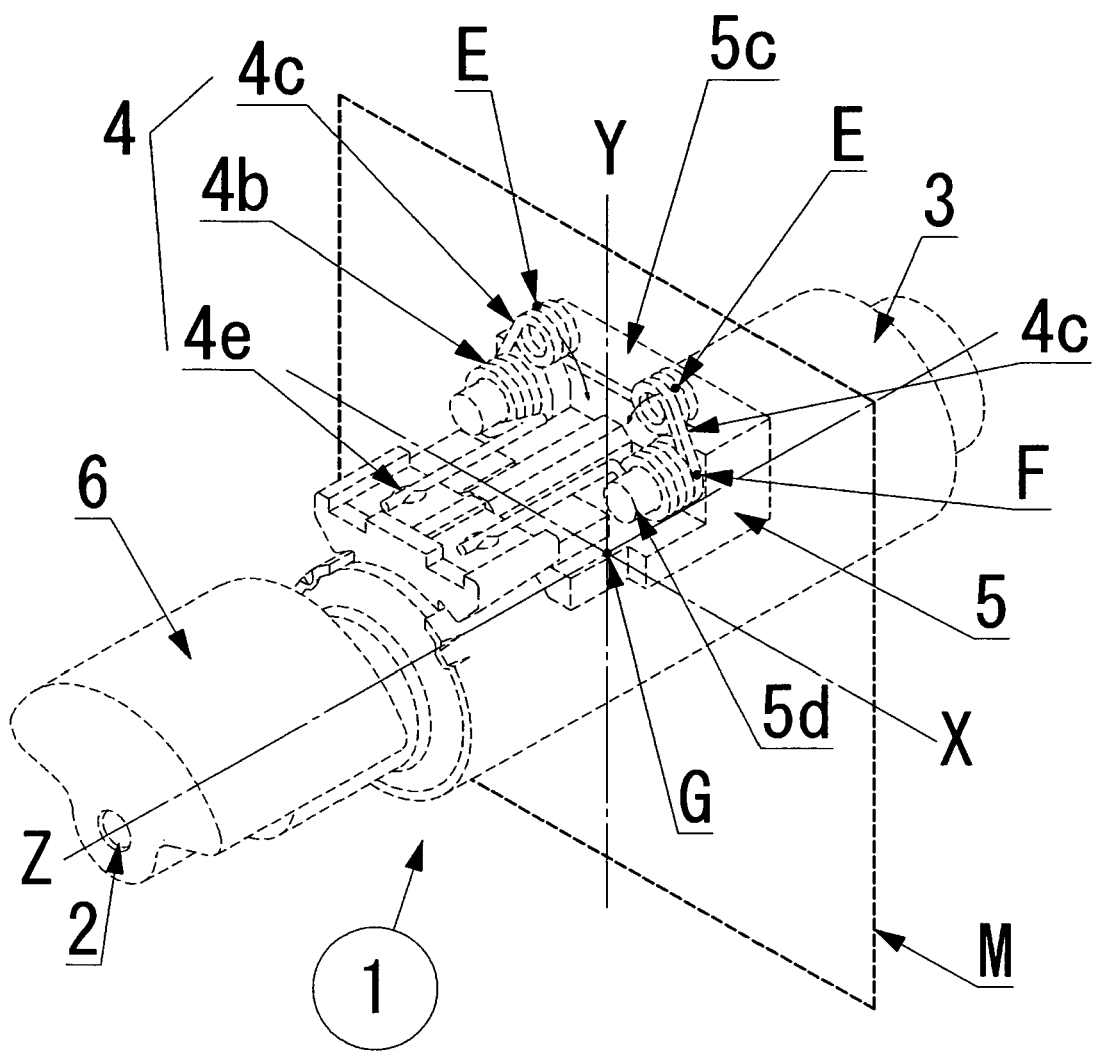
FIG. 1 is a schematic perspective view of a power supply terminal arrangement for a vibration motor relating to the first embodiment.

FIG. 1 shows a perspective view of an example of a preferred embodiment according to this invention. A vibration motor 1 according to this invention has a power supply terminal structure, wherein each of a bending point F and an action point E of a movable portion 4c movable in the direction to be in contact with a power supply land of a power supply terminal 4 is arranged in a plane M (X-Y plane) that includes the gravity center G of vibrational motion of the aforementioned vibration motor 1 and is almost perpendicular to a rotating axis 2 of the aforementioned weight 6 as shown in FIG. 1.

Figure 2:
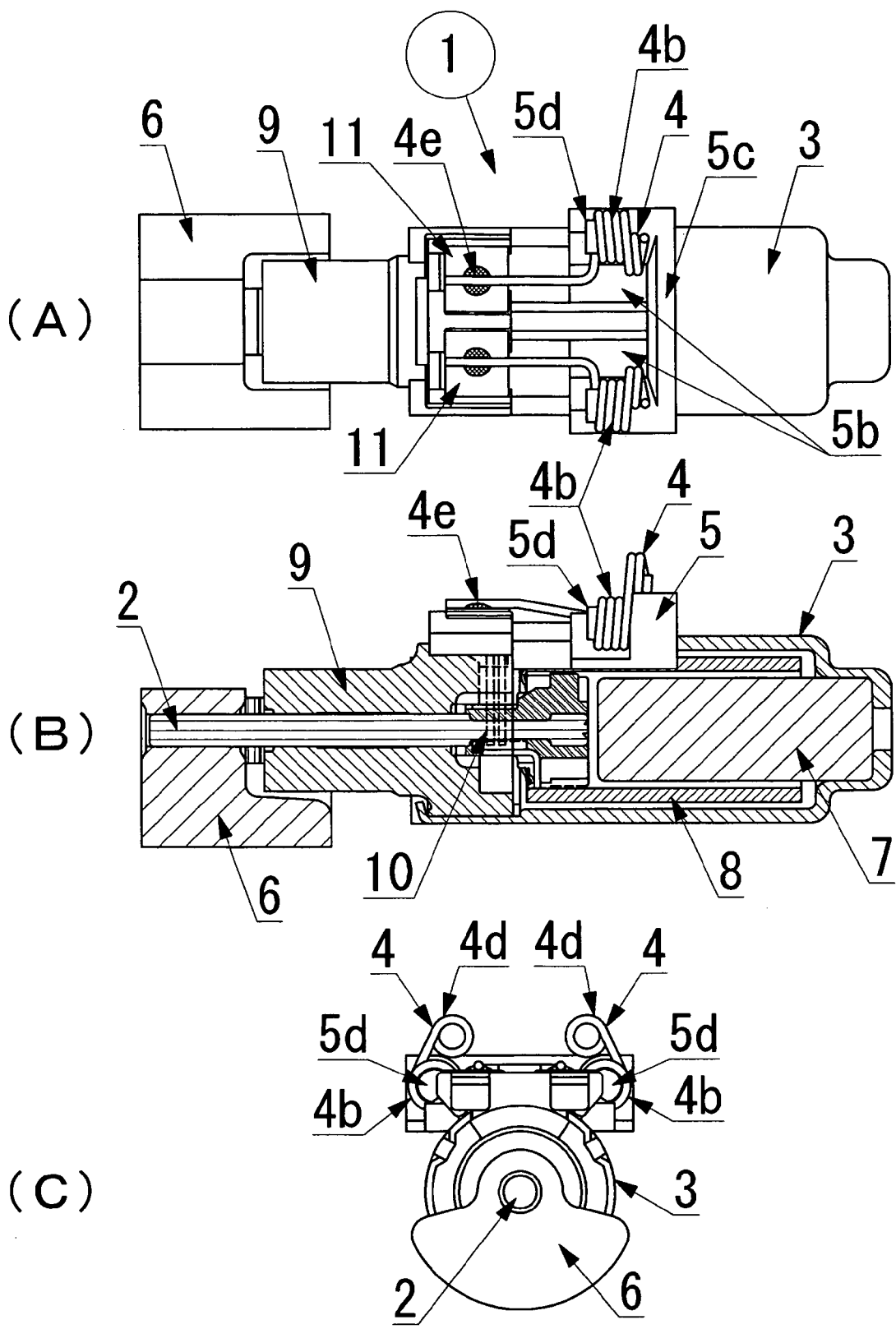
FIGS. 2A and 2C are a projection view showing the entire vibration motor relating to the first embodiment.

FIG. 2 (B) shows a schematic cross-sectional view of the interior of the aforementioned coreless motor. This vibration motor 1 has a rotating shaft 2 attached with an eccentric weight 6 and a rotor section supported by a bearing 9 for driving the rotating shaft 2 is accommodated inside a housing case 3. A drive mechanism of the motor mainly comprises the housing case 3 of stator side, a terminal block 5 for holding a power supply terminal 4, the bearing 9 and a magnet 7, in addition to the rotating shaft 2 and a winding coil 8 of the aforementioned rotor side, as well as an electrically rectifying mechanism 10 that is arranged between the rotating shaft 2 and the winding coil 8 and is necessary for rotational drive by integrally connecting the aforementioned rotating shaft 2 and the winding coil 8. This rotor section provides the weight 6 with eccentric rotation to generate vibration force.

This motor has a structure where a cylindrical magnet 7 is fitted into and fixed by a squeezed portion having a smaller diameter at an end of the housing case 3, and the bearing 9 and the terminal block 5 playing a role of a power supply mechanism are arranged at an opening end of the housing case. The terminal block 5 made of resin or other insulating material is provided along an outer cylindrical surface of the housing case 3 at the opening side of the housing case considering the relationship to the fitting position of the bearing 9. Arrangement of the terminal block in this motor structure is partly different from that of a general cylindrical coreless motor.

The power supply terminal 4 made from a conductive rod member having spring elasticity has a winding portion 4b that is deformed so as to be wound around a winding core portion 5d (cylindrical portion in the drawing) of the terminal block 5 protruding in the axial direction of the rotating shaft 2 as shown in FIG. 2. A contact portion 4d of a power supply terminal extended outwardly along the circumference of the aforementioned winding portion 4b to provide an ring-like shape by winding is formed at an end of the winding portion as shown in FIG. 2(C). Furthermore, the end of the power supply terminal 4 opposite the aforementioned winding portion 4b is electrically connected to a terminal 11 at a connecting point 4e by soldering, while the terminal 11 is electrically connected to a brush piece of the rectifying mechanism inside the motor main unit.

It is preferable that the power supply terminal 4 is made from a type of a rod-like member made of a copper alloy such as phosphor bronze, beryllium and white metal, or made of an iron alloy such as stainless steel or spring steel, all of which has properties of spring elasticity and conductivity. A part of that rod-like member is wound at the winding portion 4b to realize a coil spring structure having spring elasticity as shown in each drawing.

Figure 12:
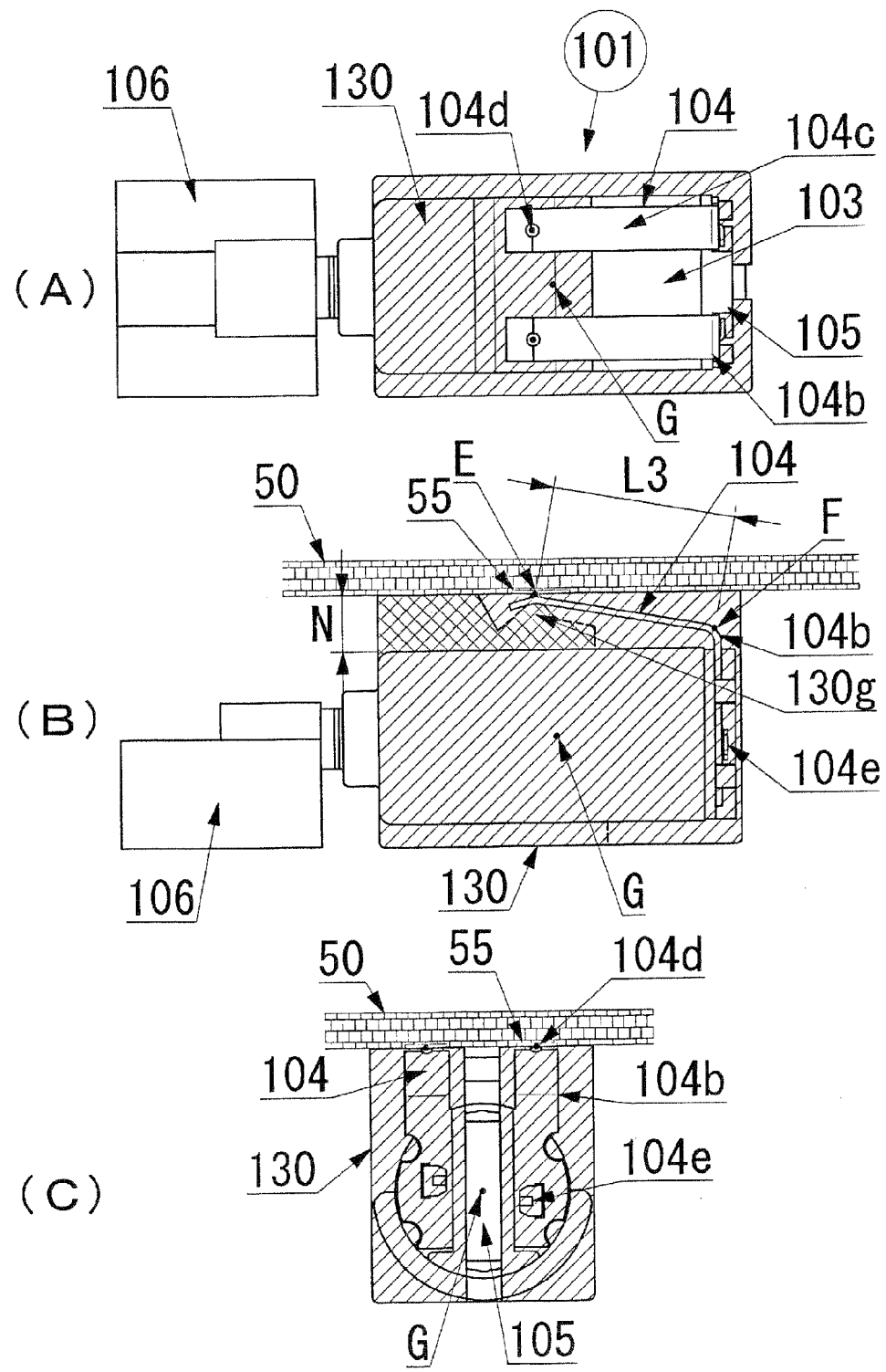
FIGS. 12A, 12B and 12C are a projection view showing the entire vibration motor having a conventional power supply terminal structure.
Figure 13:
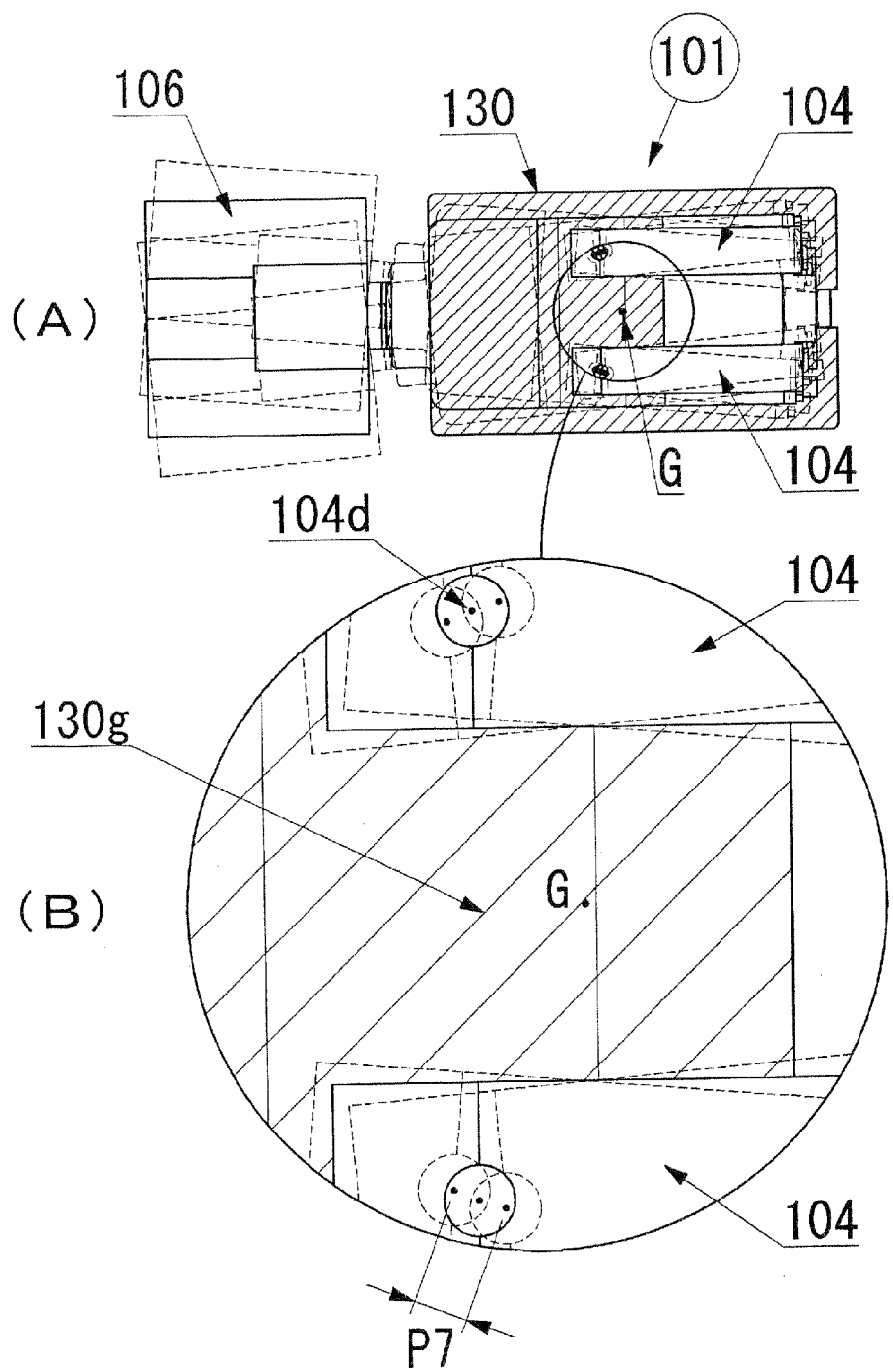
FIGS. 13A and 13B are a schematic top view showing vibrational motion of the vibration motor having a conventional power supply terminal structure associated with an enlarged view of a contact portion.
Figure 14:
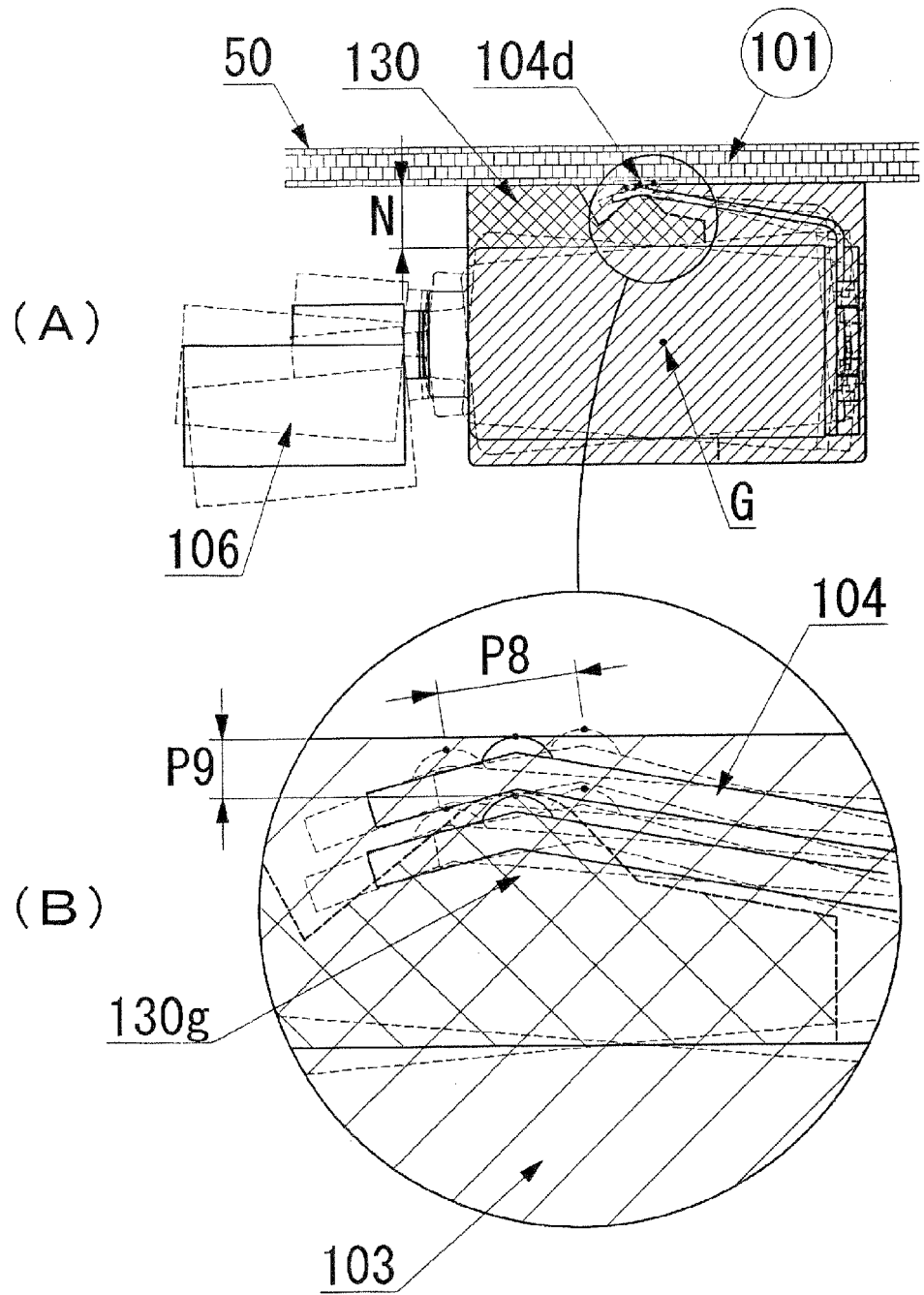
FIGS. 14A and 14B are a schematic front view showing vibrational motion of the vibration motor having a conventional power supply terminal structure associated with an enlarged view of a contact portion.
Figure 15:
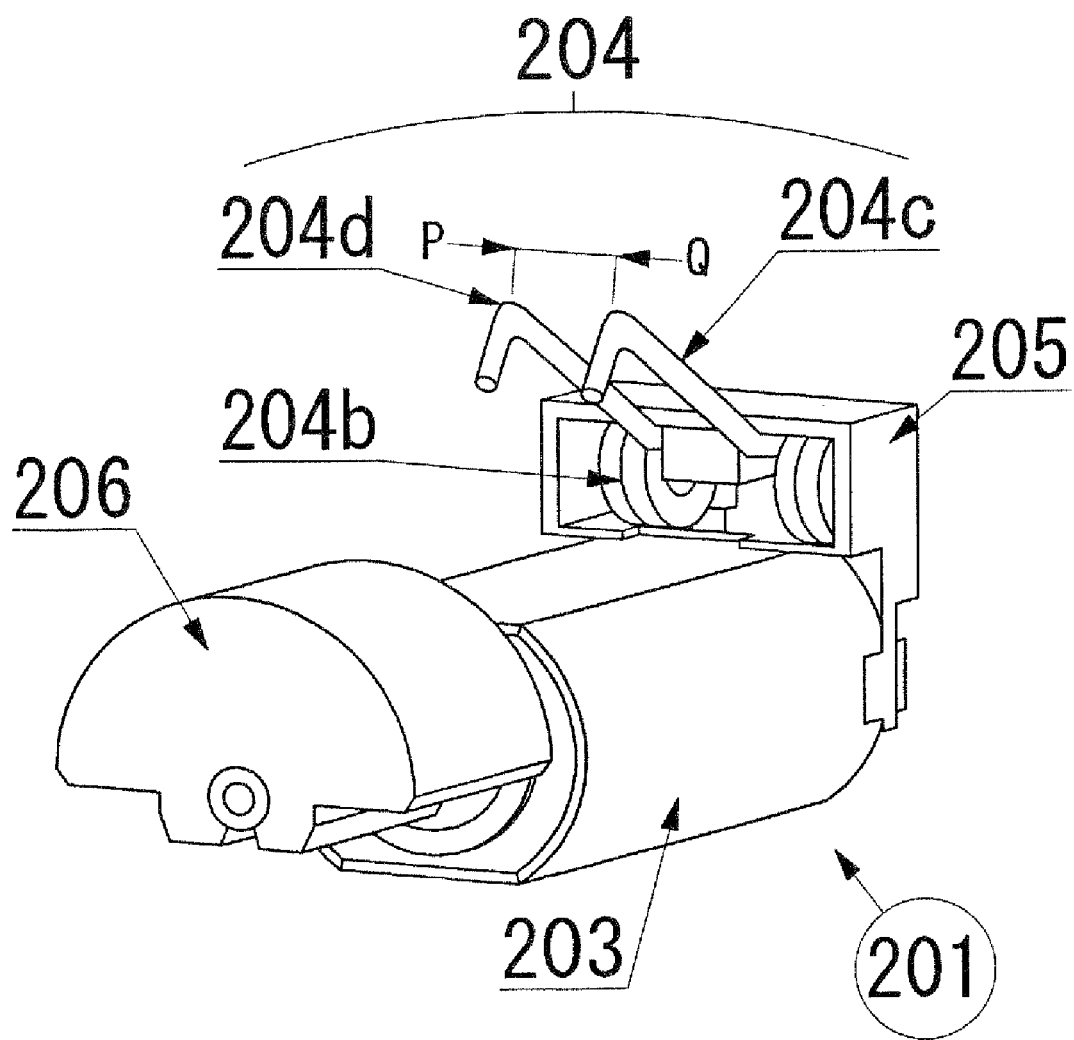
FIG. 15 is a schematic perspective view of the vibration motor having a conventional power supply terminal structure.
Figure 16:
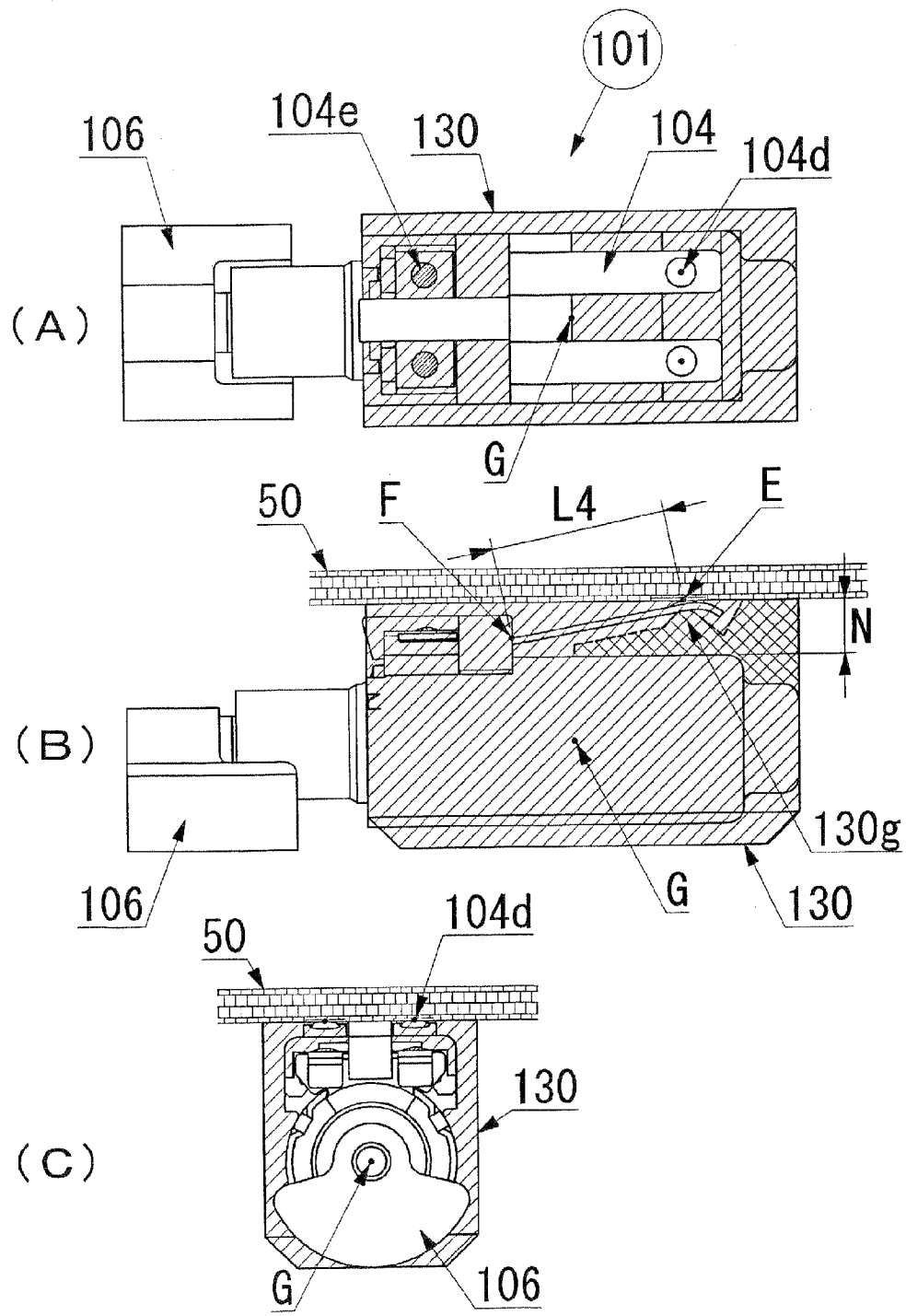
FIGS. 16A, 16B, and 16C are a projection view showing the entire vibration motor having a conventional power supply terminal structure.
Figure 17:
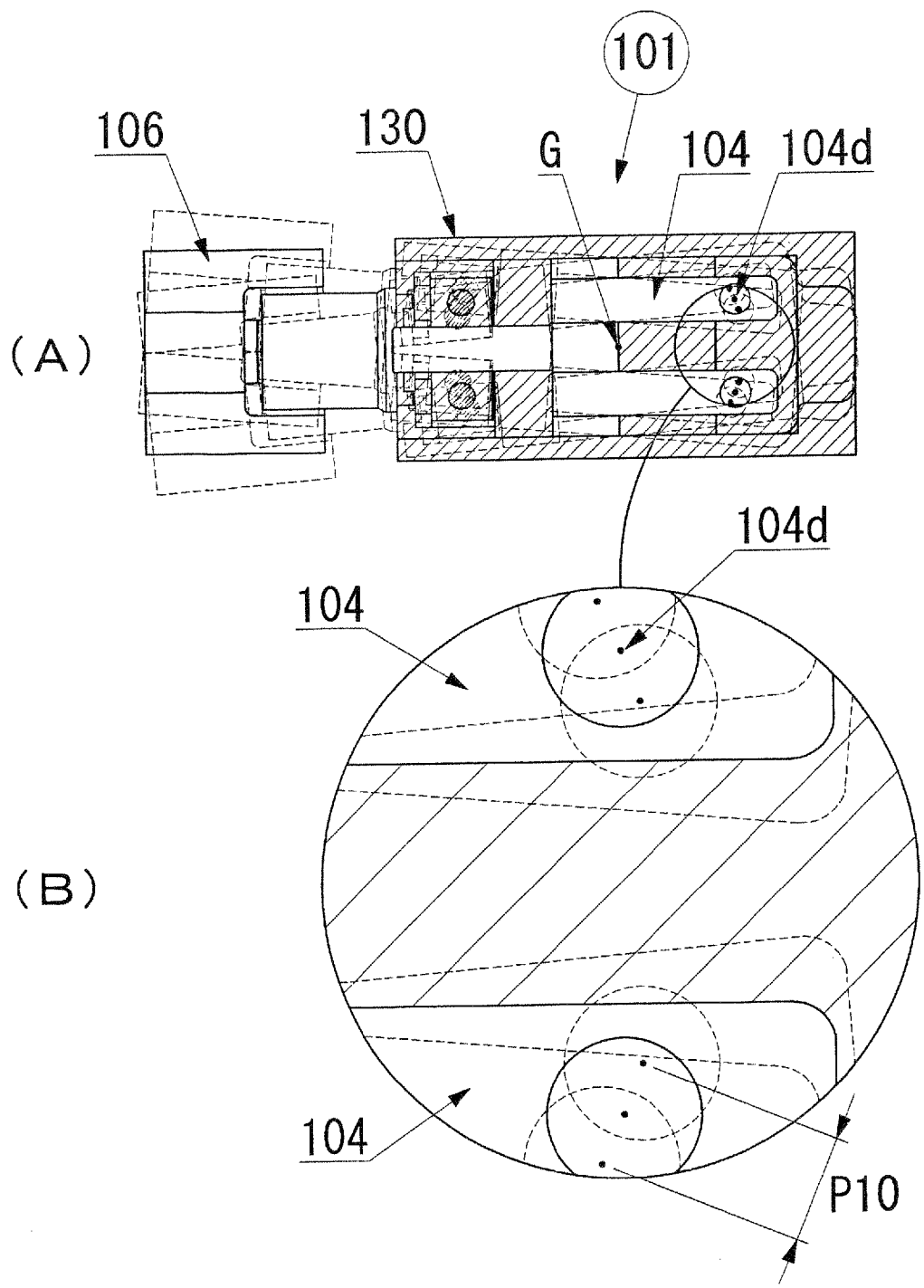
FIGS. 17A and 17B are a schematic top view showing vibrational motion of the vibration motor having a conventional power supply terminal structure associated with an enlarged view of a contact portion.
Figure 18:
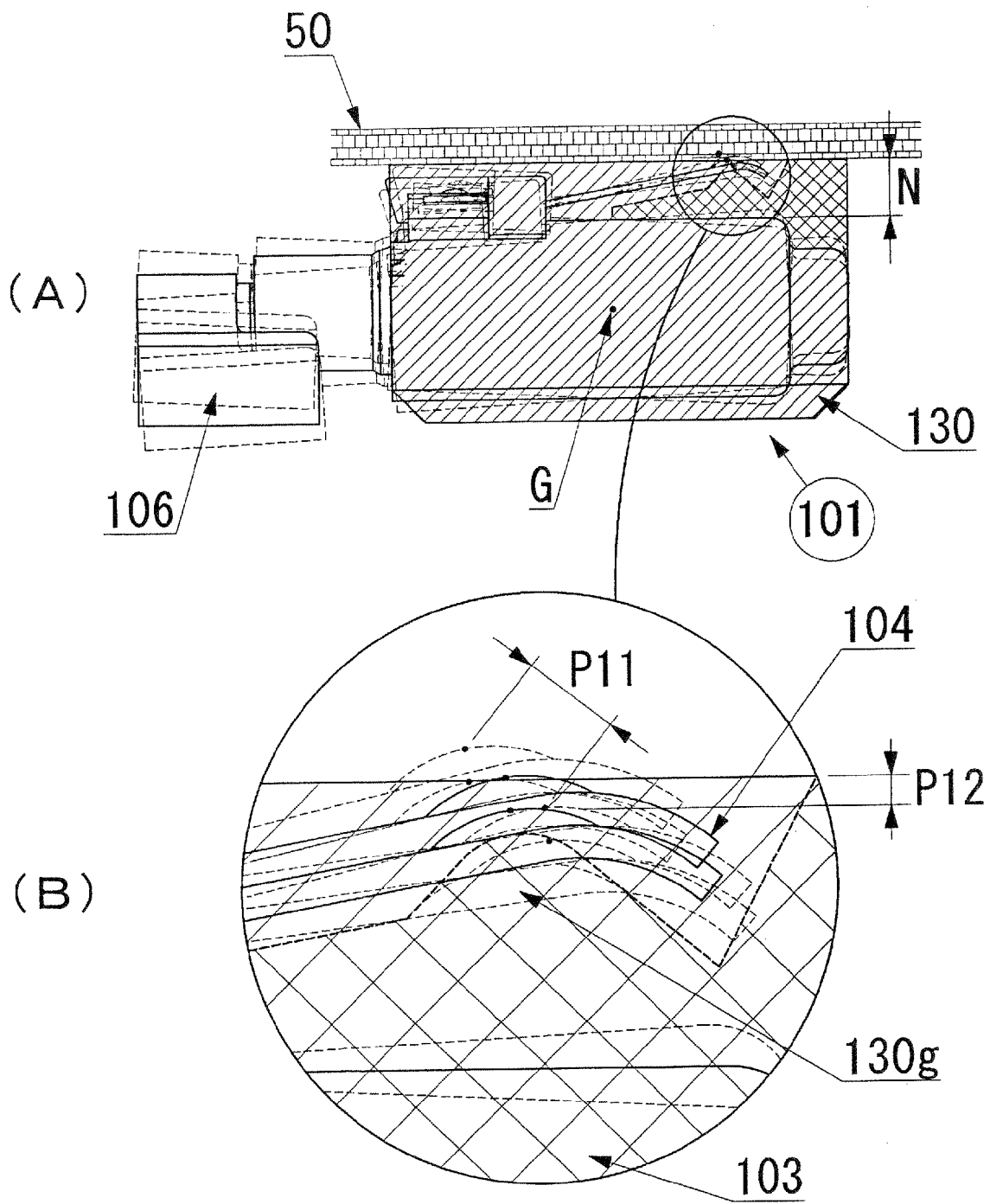
FIGS. 18A and 18B are a schematic front view showing vibrational motion of the vibration motor having a conventional power supply terminal structure associated with an enlarged view of a contact portion.
Figure 19:
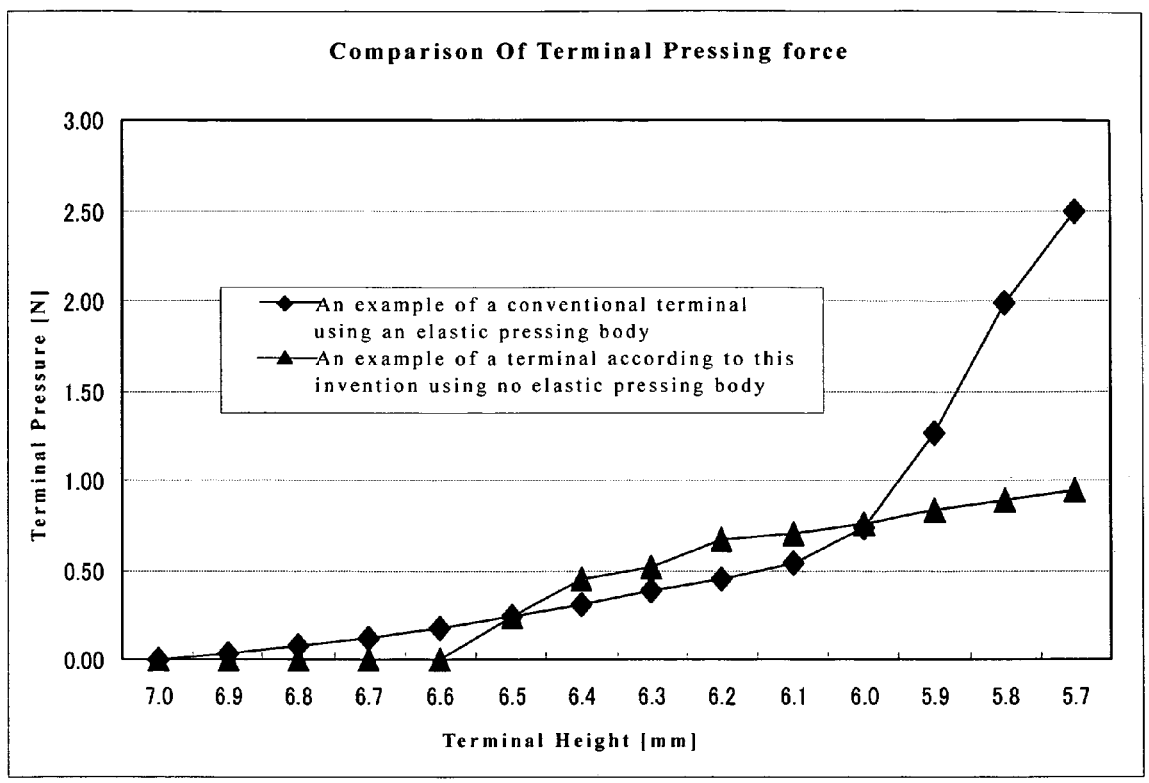
FIG. 19 is a schematic graph showing terminal pressing forces in comparison between the conventional power supply terminal structure and the power supply terminal structure according to this invention.

Since the basic design of a spring is made to provide a specific spring elastic force by properly combining a material and a diameter of the rod-like member, the number of windings of the winding portion 4b, a movable angle of a movable portion 4c of the power supply terminal, etc., the elastic force can arbitrarily be determined corresponding to an installation condition. It was found that this elastic force has extremely satisfactory value in comparison with the condition combining a conventional general leaf spring terminal and an elastic pressing body as shown in the aforementioned FIG. 12. It is most preferable not only that the pressing force of the power supply terminal contact portion acting on the circuit board is simply strong but also that a proper and constant pressing force can be maintained without fluctuation (see FIG. 19).

As for the movement of the power supply terminal, the movable portion 4c of the power supply terminal 4 is provided in a plane (plane M in the aforementioned FIG. 1) almost perpendicular to the cylinder axis of the aforementioned winding portion 5d in the condition capable of arc-like elastic deformation as shown by broken lines and arrows in FIG. 3(A). A part of the aforementioned movable portion 4c outwardly protruding from a plane portion 5c of the terminal block 5 is pressed to be in contact with a power supply land 55 of the circuit board 50 and is elastically accommodated in a concave portion 5b of the terminal block 5 (see FIG. 2) as shown in FIG. 3(B). Thus, the plane portion 5c of the aforementioned terminal block 5 is held in contact with the surface of the circuit board 50 (at the position of the power supply land 55) in a face to face manner.

Figure 7:
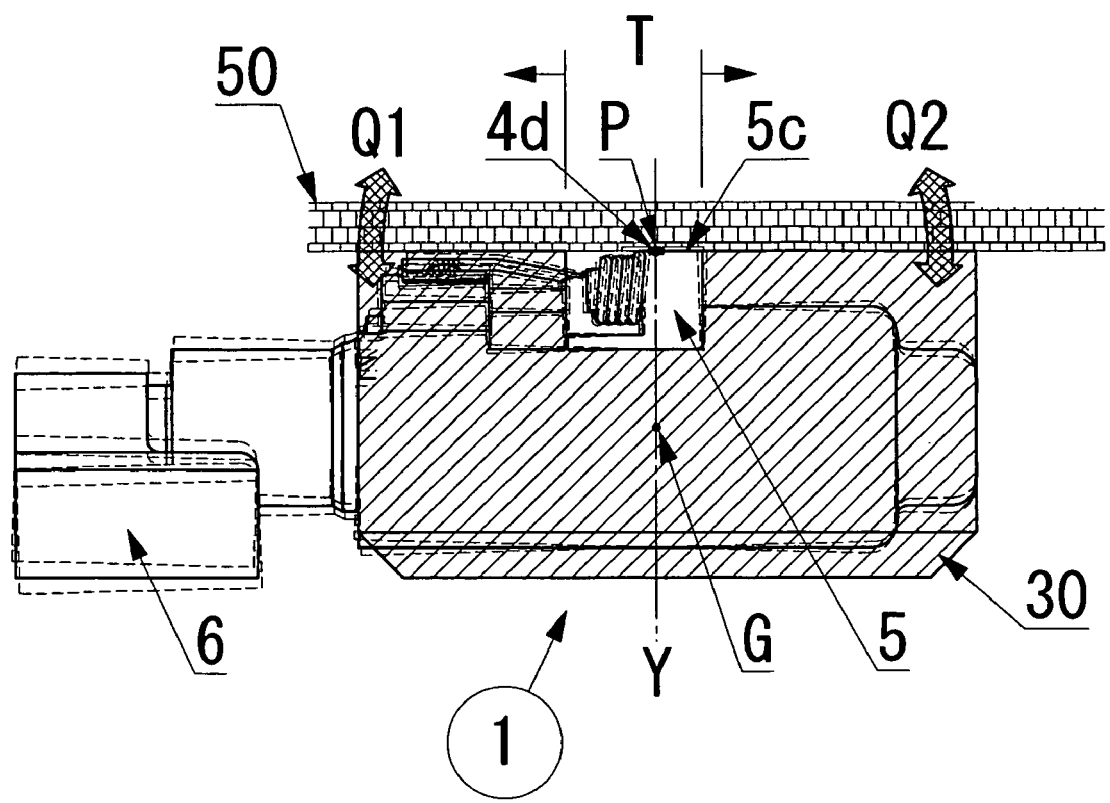
FIG. 7 is a schematic front view showing vibrational motion condition of the vibration motor with a holder relating to the first embodiment.

As a more specific example, FIG. 7 shows the condition that a holder 30 for actually covering an enclosure of a vibration motor main unit is installed to combine with the circuit board 50 inside the apparatus housing. The plane portion 5c of the terminal block 5 is directly in contact with the circuit board 50 in the condition that the contact portion 4d of the power supply terminal is accommodated in the concave portion 5b of the aforementioned terminal block 5, and the bottom surface of the holder 30 is in contact with the circuit board 50 in the same plane to hold the vibration motor 1. In this drawing, the contact position where the contact portion 4d is in contact with the power supply land of the circuit board 50 is shown by "P." The vibration motor 1 oscillates around the gravity center G of vibrational motion. Therefore, forces Q1 and Q2 are generated at both sides of a width T at the plane portion 5c of the terminal block close to the aforementioned contact position P as shown in FIG. 7. However even in this case, since the aforementioned contact point P is positioned at the center of the oscillation without being affected by the movements caused by forces Q1 and Q2 to keep the positional relationship with the circuit board 50 almost invariable, the contact portion 4d can always be in contact with the power supply land in the stable condition.

At this time, as shown in FIG. 3(B), the distance between the aforementioned winding portion 4b and the arc-like contact portion 4d of the power supply terminal, namely the distance between the bending point F and the action point E of the movable portion 4c of the power supply terminal, is extremely shorter than that of the conventional leaf spring terminal structure shown in FIG. 12(B), and the direction of the movable portion 4c of the power supply terminal extending from the bending point F to the action point E is different from that of the conventional leaf spring terminal structure by 90 degrees.

Figure 5:
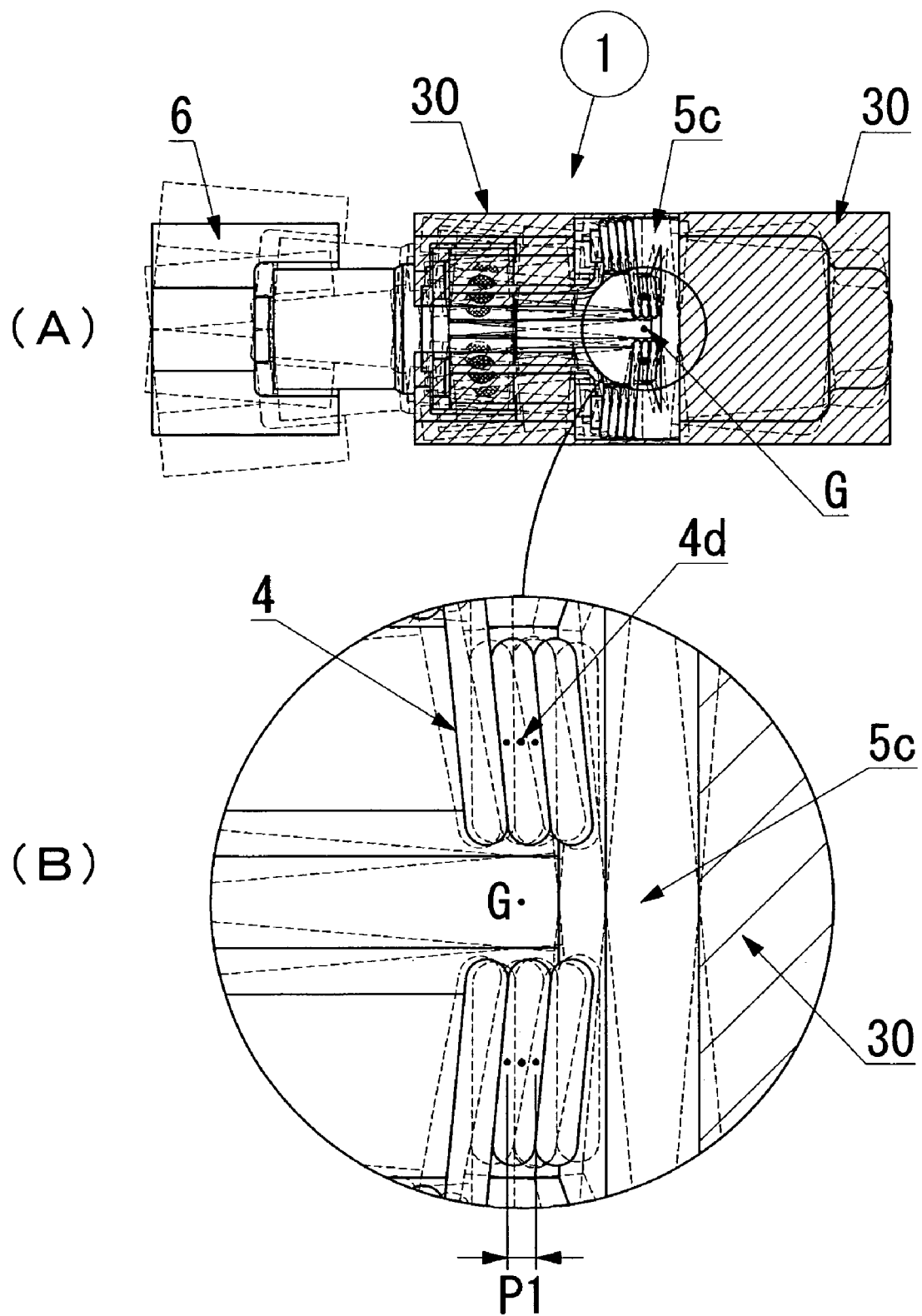
FIGS. 5A and 5B are a schematic top view showing vibrational motion of the vibration motor relating to the first embodiment associated with an enlarged view of a contact portion.
Figure 6:
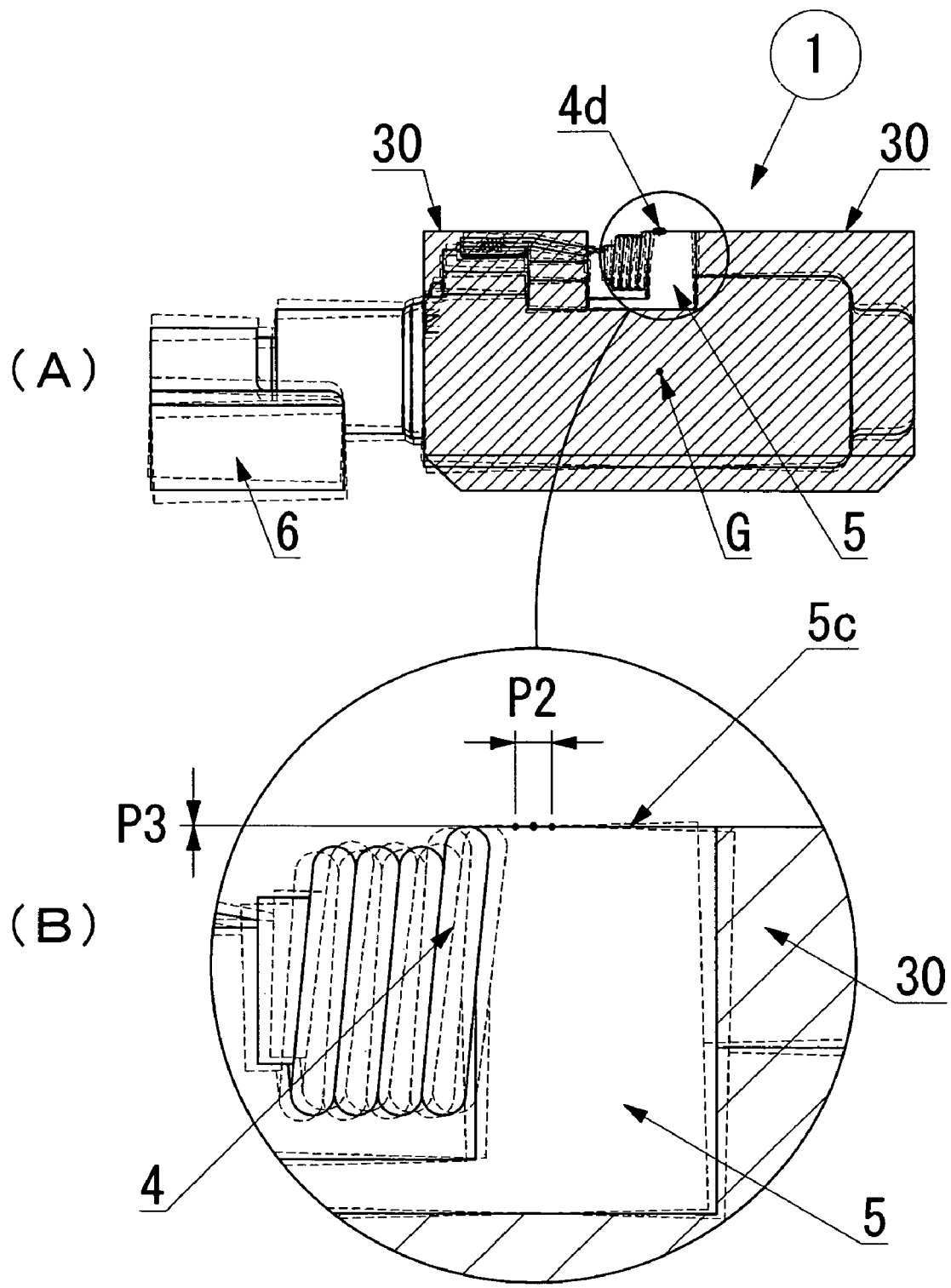
FIGS. 6A and 6B are a schematic front view showing vibrational motion of the vibration motor relating to the first embodiment associated with an enlarged view of a contact portion.

Basically, the vibration motor 1 generates a centrifugal force by driving the rotating shaft attached with an eccentric weight 6 to provide oscillating motion as shown in FIGS. 5 through 7. That is to say, the entire vibration motor 1 whirls around the aforementioned center of gravity G of vibrational motion by rotating the weight. Enlarged views of the oscillating conditions of the power supply terminal at this time are shown in the derived circles of FIGS. 5 and 6 in the same manner as shown in the previous drawing.

Figure 3:
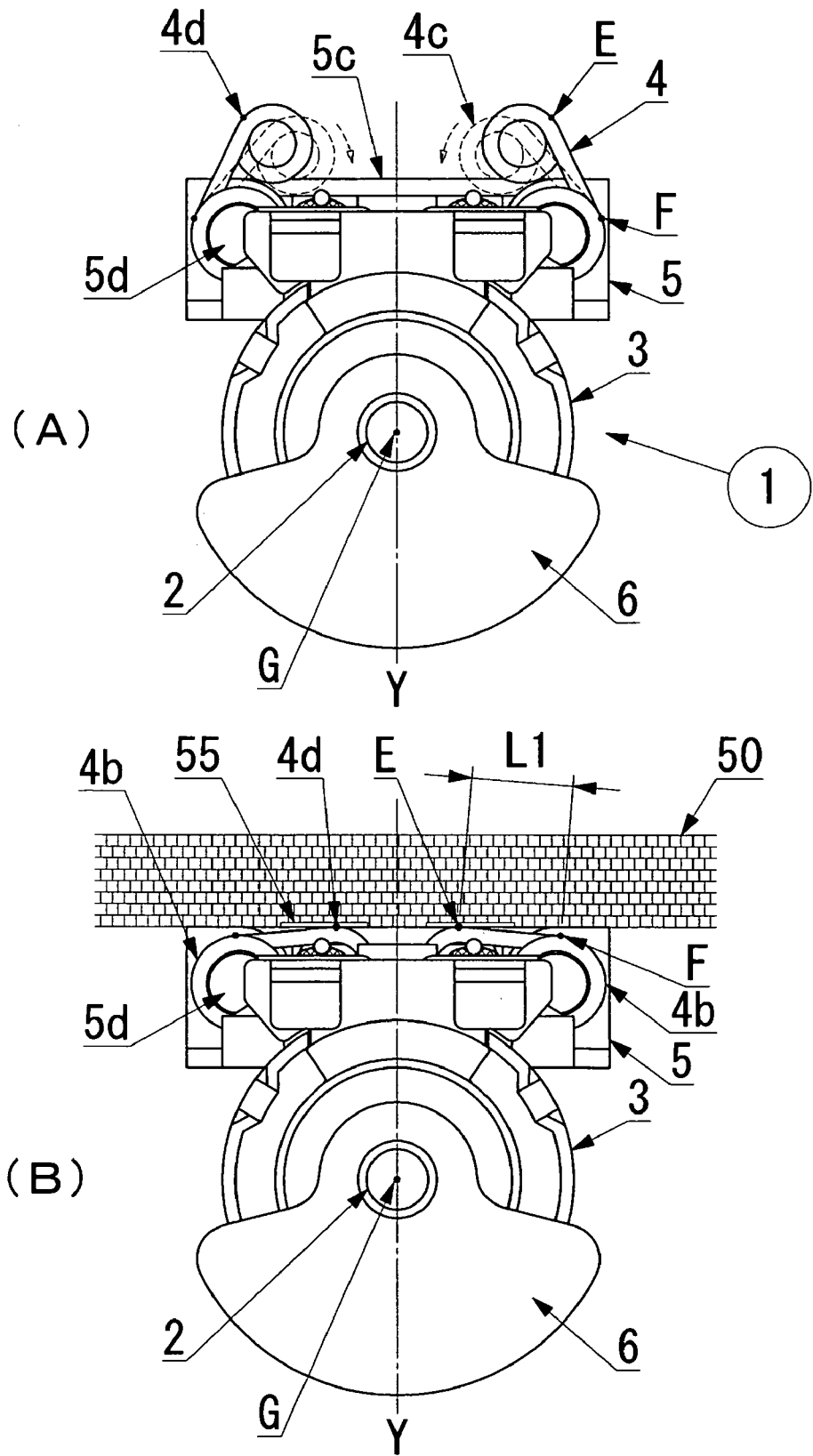
FIGS. 3A and 3B are a schematic view showing a movable direction of the power supply terminal of the vibration motor relating to the first embodiment and a positional relationship between the power supply terminal and a circuit board.

The contact portion 4d of the power supply terminal 4 slightly oscillates around the center of gravity G of vibrational motion within the amplitudes P1 and P2 when viewed from the top shown in FIG. 5 and from the front shown in FIG. 6. However, since the clearance between the circuit board 50 and the housing case 3 is kept constant by the plane portion 5c of the terminal block 5 as already described, an amplitude P3 at the contact position P is actually zero, and an overall travel amount of the contact portion 4d caused by oscillation is only the sum of P1 and P2. Furthermore, since the distance L1 between the bending point F close to the winding portion 4b of the power supply terminal 4 and the action point E as the contact portion 4d shown in FIG. 3 is short, and the action point E is positioned closer to the center of gravity G of vibrational motion, rigidity of the power supply terminal itself, and the ability of following oscillating movement are affected so that the displacement of the contact portion 4d caused by the aforementioned oscillation is minimized, and the generation of contact wear on the power supply land is restricted to eliminate poor continuity.

That is to say, since the action point E is arranged so as to be closer to the center of gravity G of vibrational motion and is movable in the plane that includes the center of gravity G of vibrational motion and is almost perpendicular to the rotating axis, an effect of oscillation can be minimized. Moreover, since the winding portion 4b of the power supply terminal structure provides sufficient spring elasticity of the power supply terminal itself, the contact portion 4d can always be connected to the power supply land of the circuit board with a constant pressing force in the condition that the contact portion is directly in contact with the plane portion 5c of the terminal block. Thus, since no displacement of the contact portion 4d due to oscillation occurs in the spring elastic deformation direction (thickness direction of the circuit board) and sliding motion possibly causing contact wear is restricted, the power supply land of the circuit board is not adversely affected eventually.

Figure 4:
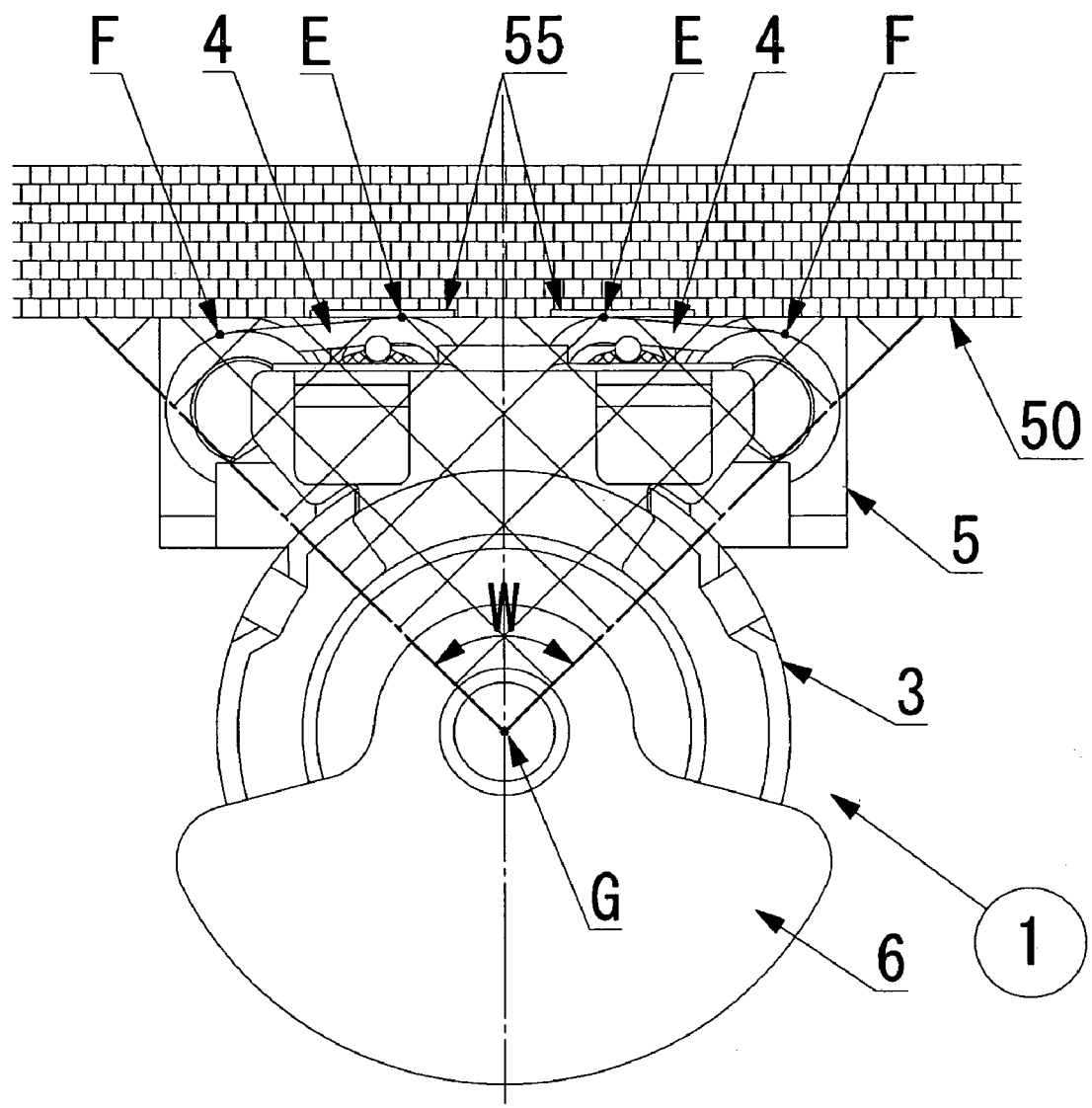
FIG. 4 is a schematic view showing a relative positional relationship between a center of gravity of vibrational motion of the vibration motor relating to the first embodiment, a bending point and an action point of the power supply terminal, and the circuit board.

When the aforementioned vibration motor 1 is built on a circuit board 50 inside a housing of a portable apparatus, the bending point F and the action point E of the aforementioned movable portion 4c of the power supply terminal 4 are arranged along the circuit board surface within an angular range W of approximately 45 degrees for one side or within that of approximately 90 degrees for both sides from a vertical line Y drawn from the aforementioned center of gravity G of vibrational motion, assuming the center of gravity as the vertex of a triangle as shown in FIG. 4. Therefore, it is possible to arrange the power supply terminal structure including the terminal block 5 in a compact and space saving manner.

Moreover, in the aforementioned pair of power supply terminals 4, an ring-like contact portion is formed at the tip end of the movable portion 4c, and the contact portion 4d with the power supply land is provided at a part of a circular periphery of the contact portion. Thus, the ring-like contact portion formed by winding can contact with the power supply land in the multiple contact manner. The ring-like outer periphery of the contact portion at the tip end of the movable portion 4c of the aforementioned power supply terminal 4 is arranged in the plane almost perpendicular to the rotating axis of the weight 6 as shown in FIG. 1. Thus, the contact portion contacts the power supply land by forming a large arc-like shape in order to restrict generation of contact wear.

As described above, since the contact portion 4d acts on the short distance from the bending point F of the winding portion 4b and contacts the power supply land 55 of the circuit board in the multiple contact manner and since the movable portion 4c is held in a narrow space of the aforementioned concave portion 5b at constant terminal pressing force, stability and reliability of the contact portion 4d with the power supply land 55 in power supply operation can always be obtained even if the power supply terminal is subjected to strong shock from the outside, such as vibration due to the drive operation of the vibration motor 1 or shock caused by dropping the apparatus main unit.

Second Embodiment

Now the structure of the second embodiment according to this invention is described referring to FIGS. 8 through 11. By the way, the portions identical to those in the first embodiment are provided with the same item numbers and repetitive descriptions are omitted or simplified.

The points differing from the aforementioned first embodiment is that the power supply terminal consisting mainly of the aforementioned winding portion is modified to that having a shape of a torsion spring, that the ring-like tip end of the movable end of the power supply terminal is modified to a shape bent like a letter V as a shape for connecting, and that the arrangement of the internal structure of the coreless motor is modified. An inclining structure where a pair of power supply terminals inclines in the internal direction with each other is the same as the first embodiment.

In other words, the aforementioned pair of power supply terminals is made from torsion springs wherein a part of an axial straight line of a conductive rod-like member having spring property is deformed by twisting. A contact portion contacting with a power supply land of the aforementioned power supply terminal is positioned at the vertex of a V-shaped portion obtained by bending a part of an axial straight line of the aforementioned rod-like member, and a movable portion and a contact portion are arranged in a plane almost perpendicular to the axis passing through the aforementioned center of gravity of vibrational motion in the condition that the contact portion is movable in an arc-like elastic deformation as shown in FIGS. 8 and 9.

Figure 8:
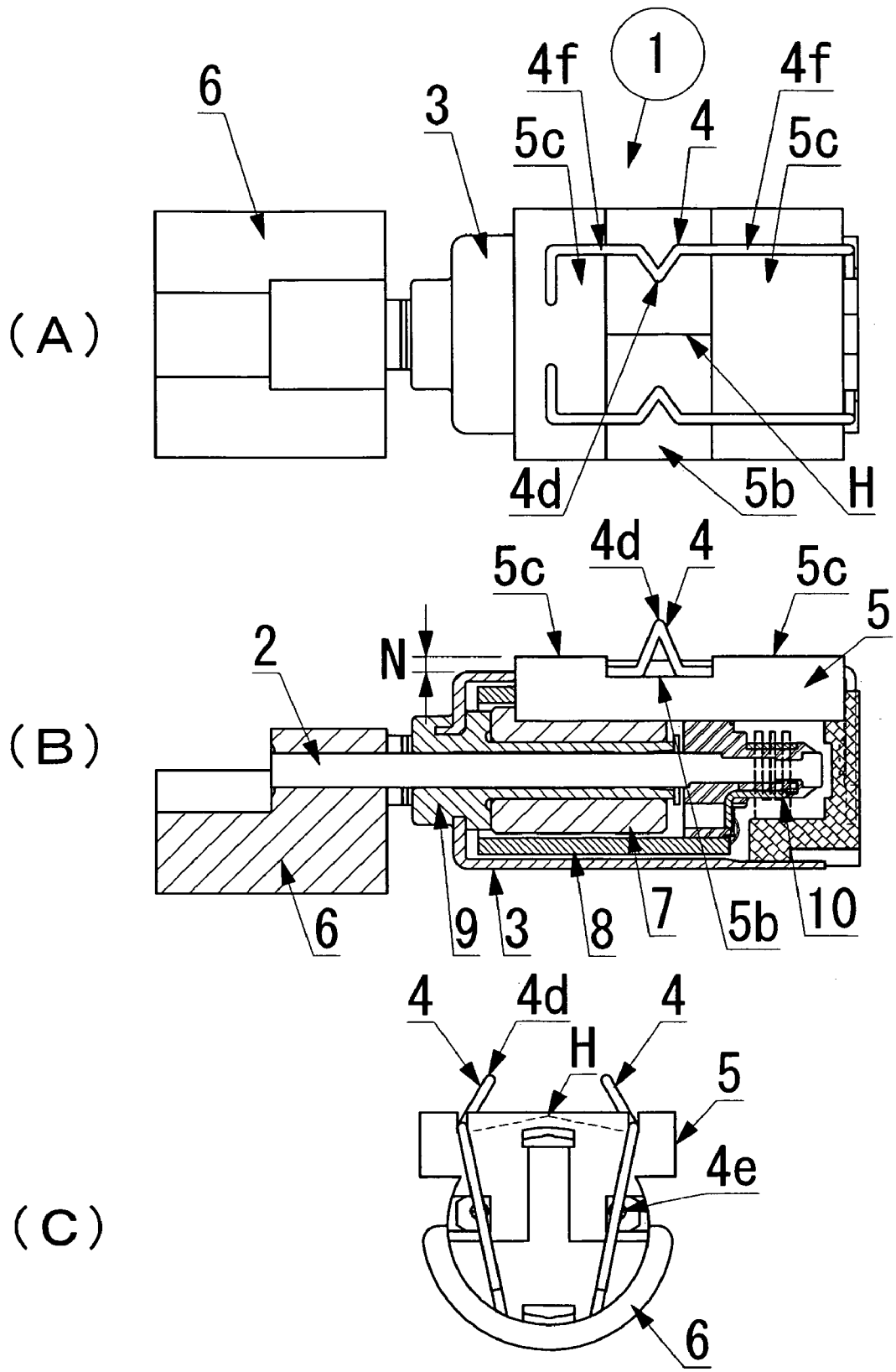
FIGS. 8A, 8B and 8C are a projection drawing showing the entire vibration motor relating to the second embodiment.
Figure 9:
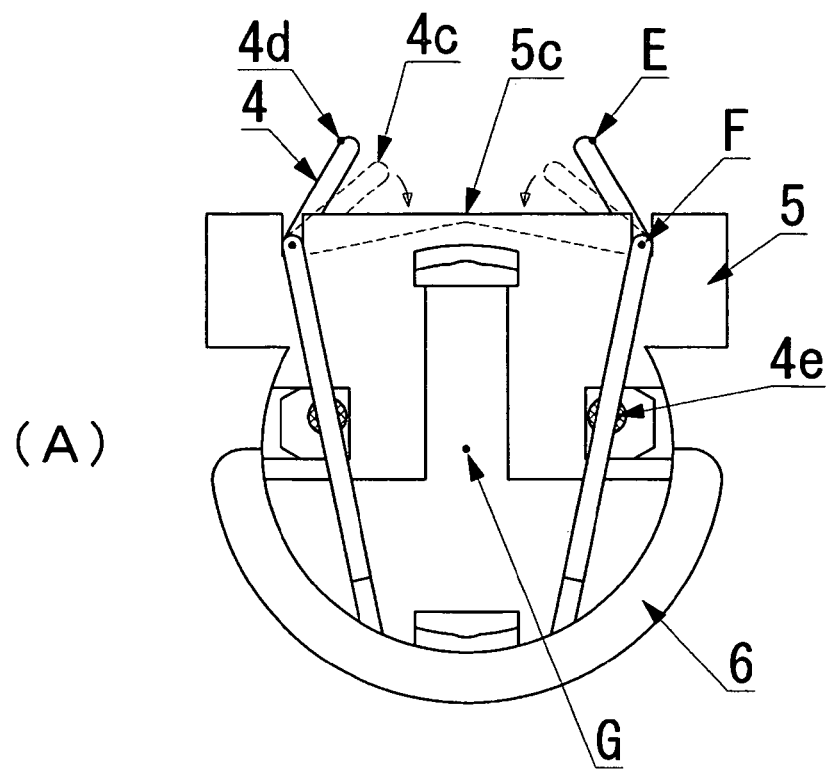
FIGS. 9A and 9B are a schematic view showing a movable direction of the power supply terminal of the vibration motor relating to the second embodiment and a positional relationship between the power supply terminal and a circuit board.
Figure 9:
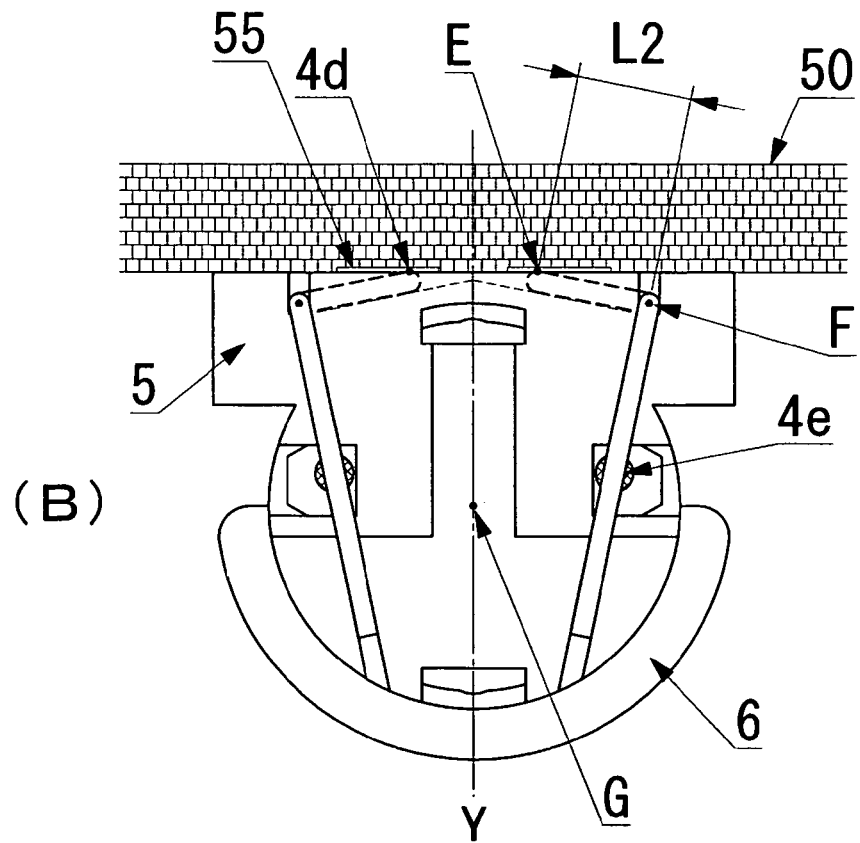

The power supply terminal 4 shown in FIG. 8 has an almost letter V shape of which the vertex works as the contact portion 4d, and twisting portions 4f are arranged in straight line portions at both sides of the contact portion. The simpler and more compact power supply terminal structure, having no possibility of direct contact between positive and negative poles, facilitates assembly during mass production and stabilizes electrification during mounting.

The power supply terminal 4 shown in FIG. 8 has a structure designed so as to minimize the height in the direction vertical to the circuit board surface when a vibration motor 1 is built in. For example, the vertical clearance N between the outer periphery of a housing case 3 and a plane portion 5c of the terminal block contributes to space saving as clearly shown when comparing the conventional vertical clearance N illustrated in FIG. 12. Thus, the height of the entire vibration motor can be minimized.

A concave portion 5b is provided with slopes having a ridgeline H. When mounting on the circuit board 50, even if the aforementioned pair of power supply terminals 4 with positive and negative poles move to allow each movable portion 4c to incline inward, the contact portions 4d stop at the position in contact with the slopes and is accommodated. Thus, it is possible to improve mounting efficiency onto the surface of the circuit board 50, that is to say, to minimize the aforementioned vertical clearance N and to keep elastic pressing force acting on the power supply land constant without being affected by the external motion such as oscillation.

The movable portion 4c of the power supply terminal 4 is provided in a plane almost perpendicular to the axial straight line of the aforementioned rod-like member to be subjected to torsional deformation in the condition capable of an arc-like elastic deformation as shown by broken lines and arrows in FIG. 9(A). A part of the aforementioned movable portion 4c outwardly protruding from a flat surface portion 5c of the terminal block 5 is pressed to be in contact with a power supply land 55 of the circuit board 50 and is elastically accommodated in a concave portion 5b of the terminal block 5 (see FIG. 2) as shown in FIG. 9(B). Thus, the plane portion 5c of the aforementioned terminal block 5 is held in contact with the surface of the circuit board 50 (at the position of the power supply land 55) in a face-to-face manner.

Figure 10:
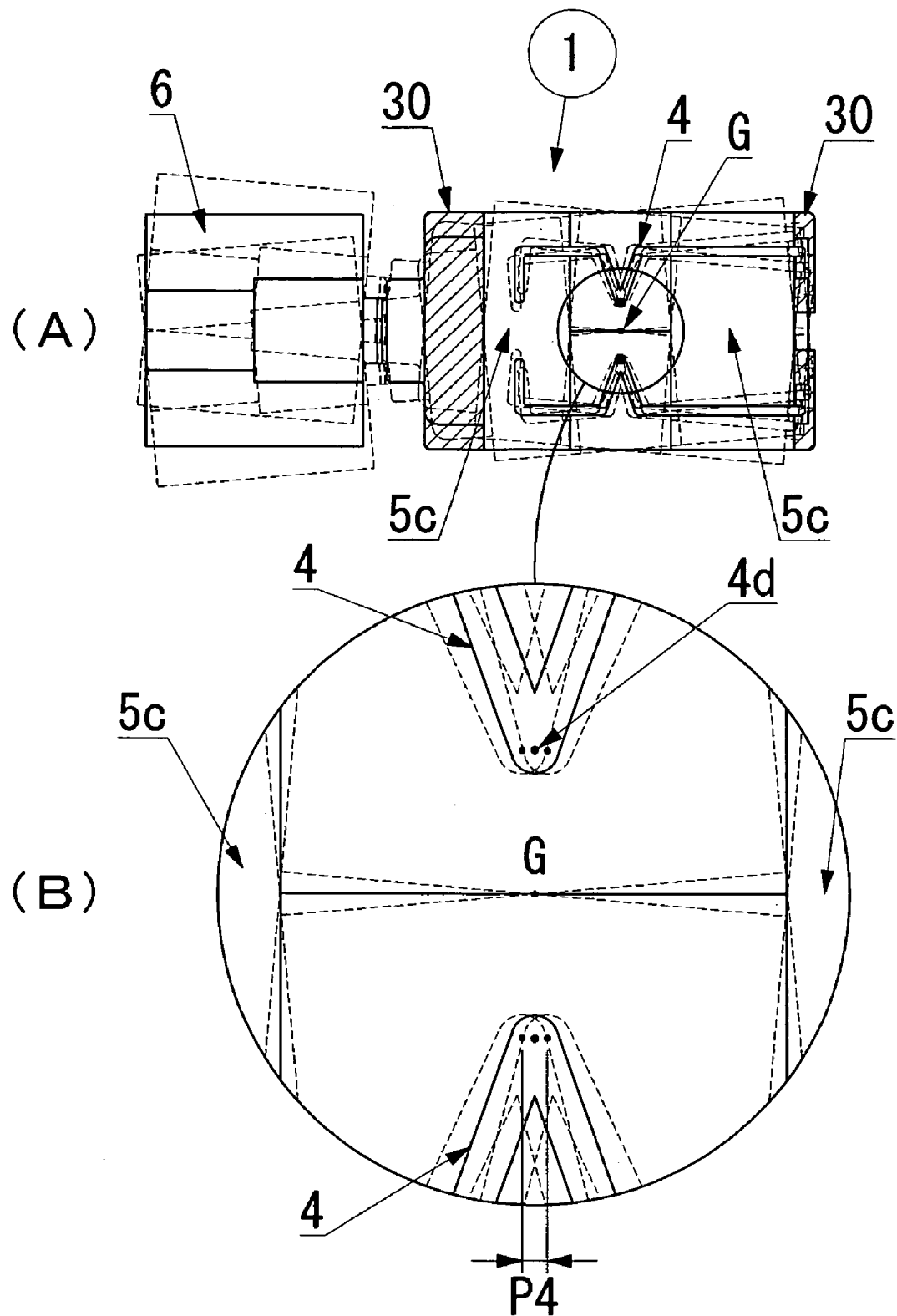
FIGS. 10A and 10B are a schematic top view showing vibrational motion of the vibration motor relating to the second embodiment associated with an enlarged view of a contact portion.
Figure 11:
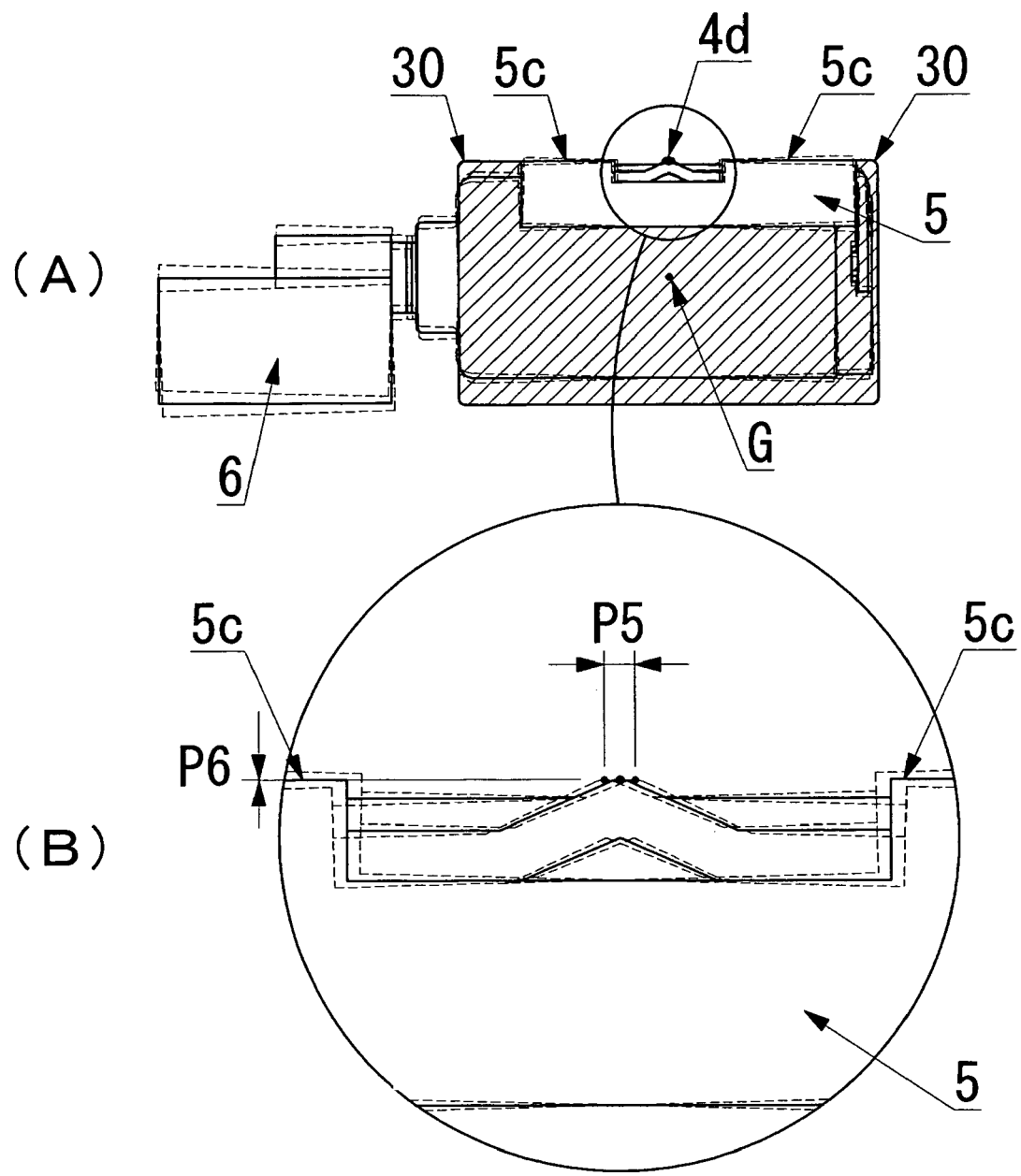
FIGS. 11A and 11B are a schematic front view showing vibrational motion of the vibration motor relating to the second embodiment associated with an enlarged view of a contact portion.

Basically, the vibration motor 1 generates a centrifugal force by driving the rotating shaft attached with an eccentric weight 6 to provide oscillating motion as shown in FIGS. 10 through 11. That is to say, the entire vibration motor 1 whirls around the aforementioned center of gravity G of vibrational motion by rotating the weight. Enlarged views of the oscillating conditions of the power supply terminal at this time are shown in the derived circles of FIGS. 10 and 11 in the same manner as shown in the previous drawing.

The contact portion 4d of the power supply terminal 4 oscillates slightly around the center of gravity G of vibrational motion within the amplitudes P4 and P5 when viewed from the top as shown in FIG. 10 and from the front as shown in FIG. 11. However, since the clearance between the circuit board 50 and the housing case 3 is kept constant by the plane portion 5c as already described, an amplitude P6 at the contact position is actually zero, and an overall travel amount of the contact portion 4d of the power supply terminal 4 caused by oscillation is only the sum of P4 and P5. Further, since the distance L2 between the bending point F of the power supply terminal 4 and the action point E as the contact portion 4d shown in FIG. 9(B) is short and the action point E is positioned closer to the center of gravity G of vibrational motion, the aforementioned general travel amount of P4 and P5 decreases, and rigidity of the power supply terminal itself and the ability of following oscillating movement are affected so that the displacement of the contact portion 4d caused by the aforementioned oscillation is minimized. Thus, the generation of contact wear on the power supply land is restricted to eliminate poor continuity.

That is to say, since the action point E is arranged so as to be closer to the center of gravity G of vibrational motion and is movable in the plane that includes the center of gravity G of vibrational motion and is almost perpendicular to the rotating axis, an effect of oscillation can be minimized. Moreover, since the twisting portion 4f of the power supply terminal structure provides spring elasticity of the power supply terminal itself sufficiently, the contact portion 4d can always be connected to the power supply land of the circuit board with a constant pressing force in the condition that the contact portion is directly in contact with the plane portion 5c of the terminal block. Thus, since no displacement of the contact portion 4d due to oscillation occurs in the spring elastic deformation direction (thickness direction of the circuit board) and sliding motion possibly causing contact wear is restricted, the power supply land of the circuit board is not adversely affected.

When the aforementioned vibration motor 1 is built on a circuit board 50 inside a housing of a portable apparatus, the bending point F and the action point E of the aforementioned movable portion 4c of the power supply terminal are arranged along the circuit board surface within an angular range of approximately 45 degrees for one side or within that of approximately 90 degrees for both sides from a vertical line Y drawn from the aforementioned center of gravity of vibrational motion assuming the center of gravity G as the vertex of a triangle as the arrangement shown in FIG. 4. Therefore, it is possible to arrange the power supply terminal structure including the terminal block 5 in a compact and space saving manner.

This invention can be modified in various ways based on the technical concept of various embodiments. It will be obvious that the vibration generating mechanism according to this invention can apply not only to the cylindrical coreless motor described in the embodiment but also to various types of electric motors having a rotating shaft. Furthermore, the holder is not necessarily made of an elastic material but should be made of any material having an insulation property. The holder is not necessarily mounted on the vibration motor only if the positional relationship between the aforementioned circuit board and the plane portion of the terminal block is maintained.

The vibration generating mechanism according to this invention can be mounted on multi-functional mobile phones including a mobile phone with a camera requiring a vibration function, wristwatch type PHSs, mobile communication devices such as local small radio units, various types of telecommunication terminals such as portable PDAs, controllers for game machines generating sensible vibration, and general electronic devices including electronic toys such as pocket game machines.

The invention claimed is:

1. A motor for generating vibration comprising:
   a vibration generating mechanism having a rotating shaft attached with a weight,
   a housing case for accommodating at least a part of the vibration generating mechanism, and
   a pair of power supply terminals protruding from the housing for electrically and elastically connecting the power supply terminal to a power supply land by making contact with the power supply land of a power source side circuit board to be mounted in a housing of a portable apparatus and for supplying power to the vibration generating mechanism,
   wherein each of a bending point and an action point of a movable portion of the power supply terminal movable in the direction in which the power supply terminal contacts the power supply land is arranged in a plane that includes a center of gravity of vibrational motion of the motor for generating vibration and is almost perpendicular to a rotating axis of the weight.

2. A motor for generating vibration according to claim 1, wherein, with respect to a positional relationship between a center of gravity of vibrational motion of the motor for generating vibration and an action point of a movable portion of a power supply terminal arranged in a plane that includes the center of gravity of vibrational motion and is almost perpendicular to a rotating axis of a weight, when the motor for generating vibration is built on a circuit board inside a housing of a portable apparatus, the action point of the movable portion of the power supply terminal that is movable while in contact with a power supply land is arranged in a direction in which the action point approaches the center of gravity of vibrational motion.

3. A motor for generating vibration according to claim 1, wherein, with respect to a positional relationship between a center of gravity of vibrational motion of the motor for generating vibration and an action point of a movable portion of a power supply terminal arranged in a plane that includes the center of gravity of vibrational motion and is almost perpendicular to a rotating axis of a weight, when the motor for generating vibration is built on a circuit board inside a housing of a portable apparatus, the action point of the movable portion of the power supply terminal that is movable while in contact with a power supply land is arranged in a condition that the action point is movable in a direction almost perpendicular to the power supply land or in an almost circumferential direction.

4. A motor for generating vibration according to claim 1, wherein, with respect to a positional relationship between a bending point and an action point of a power supply terminal provided along a plane that includes a center of gravity of vibrational motion of the motor for generating vibration and is almost perpendicular to a rotating axis of a weight, when the motor for generating vibration is built on a circuit board inside a housing of a portable apparatus, the action point of the movable portion of the power supply terminal is arranged so that the action point is closer than a bending point to a vertical line drawn from the center of gravity of vibrational motion onto the circuit board.

5. A motor for generating vibration according to claim 1, wherein, with respect to a relationship among a center of gravity of vibrational motion of the motor for generating vibration, a bending point and an action point of a movable portion of a power supply terminal arranged in a plane that includes the center of gravity of vibrational motion and is almost perpendicular to a rotating axis of a weight, when the motor for generating vibration is built on a circuit board inside a housing of a portable apparatus, the bending point and the action point of the movable portion of the power supply terminal are arranged along a circuit board surface within an angular range of approximately 45 degrees for one side or within approximately 90 degrees for both sides from a vertical line drawn from the center of gravity of vibrational motion assuming the center of gravity as the vertex of a triangle.

6. A motor for generating vibration according to claim 1, wherein a ring-like contact portion is formed at a tip end of a movable portion of the power supply terminal, and a contact portion with a power supply land is arranged at a part of an outer periphery of the ring-like contact portion.

7. A motor for generating vibration according to claim 1, wherein a ring-like contact portion is formed at a tip end of a movable portion of the power supply terminal, and a multi-contact portion with a power supply land is arranged at a part of an outer periphery of the circular contact portion.

8. A motor for generating vibration according to claim 6, wherein an outer periphery of a circular contact portion at a tip end of a movable portion of the power supply terminal is arranged in a plane almost perpendicular to a rotating axis of a weight.

9. A motor for generating vibration according to claim 1, wherein the power supply terminal is manufactured by forming an elastic spring member made from a wire rod.

10. A motor for generating vibration according to claim 1, wherein at least a part of a terminal block holding the pair of power supply terminals is positioned at the center of an outer side of a housing case cylinder, the terminal block has a shape of a plane, which is formed in parallel with a rotating axis of a weight, the plane portion of the terminal block keeps the clearance between the housing case and the circuit board surface constant, and when the motor for generating vibration is built on a circuit board inside a housing of a portable apparatus, the circuit board surface is directly in contact with the plane portion of the terminal block in a face-to-face manner, and at the same time the contact portion of the power supply terminal is electrically connected to the power supply land of the circuit board in almost the same plane as the plane portion of the terminal block.

11. A motor for generating vibration according to claim 1, wherein a part of the power supply terminal is held in a condition of winding around a winding core section provided to the terminal block.

12. A motor for generating vibration according to claim 1, further comprises:

a holder for holding the motor for generating vibration in a housing of a portable apparatus, wherein, when an aforementioned motor for generating vibration is built on a circuit board inside a housing of a portable apparatus, a grounding plane portion on which a holder covering a housing case of the motor for generating vibration in contact with the circuit board surface is positioned at both ends of a rotating axis of a weight on a plane portion of a terminal block of the motor for generating vibration, and the plane portion of the terminal block and the grounding plane portion of the holder are arranged in almost the same plane.

13. A motor for generating vibration according to claim 1, wherein the motor for generating vibration is mounted on a circuit board inside the housing of a portable apparatus, and the power supply land of the circuit board is electrically connected to the power supply terminal of the motor for generating vibration in the condition that the power supply land is elastically in contact with the power supply terminal by an action for assembling the housing of an apparatus.

* * * * *